(12) United States Patent
Brown et al.

(10) Patent No.: US 7,698,230 B1
(45) Date of Patent: Apr. 13, 2010

(54) TRANSACTION ARCHITECTURE UTILIZING TRANSACTION POLICY STATEMENTS

(75) Inventors: Bruce E. Brown, Orem, UT (US); D. Brent Israelsen, Alpine, UT (US)

(73) Assignee: ContractPal, Inc., Orem, UT (US)

(*) Notice: Subject to any disclaimer, the term of this patent is extended or adjusted under 35 U.S.C. 154(b) by 2054 days.

(21) Appl. No.: 10/366,272

(22) Filed: Feb. 13, 2003

Related U.S. Application Data

(60) Provisional application No. 60/357,388, filed on Feb. 15, 2002, provisional application No. 60/377,356, filed on May 1, 2002.

(51) Int. Cl.
*G06F 17/00* (2006.01)

(52) U.S. Cl. .............................. 705/75; 705/1; 705/50; 705/51; 380/30

(58) Field of Classification Search ................ 705/1, 705/50–79
See application file for complete search history.

(56) References Cited

U.S. PATENT DOCUMENTS

| | | | |
|---|---|---|---|
| 5,182,705 A | 1/1993 | Barr et al. ................... 364/401 |
| 5,903,721 A * | 5/1999 | Sixtus ........................... 726/2 |
| 5,920,861 A | 7/1999 | Hall et al. ...................... 707/9 |
| 5,960,420 A | 9/1999 | Leymann et al. ............... 707/1 |
| 6,009,405 A | 12/1999 | Leymann et al. ............... 705/9 |
| 6,044,352 A * | 3/2000 | Deavers ........................ 705/4 |
| 6,052,785 A * | 4/2000 | Lin et al. ........................ 726/5 |
| 6,073,109 A | 6/2000 | Flores et al. ................... 705/8 |
| 6,138,119 A | 10/2000 | Hall et al. ...................... 707/9 |
| 6,157,721 A | 12/2000 | Shear et al. ................. 380/255 |
| 6,205,434 B1 * | 3/2001 | Ryan et al. ................ 705/36 R |
| 6,208,973 B1 * | 3/2001 | Boyer et al. .................... 705/2 |
| 6,237,096 B1 * | 5/2001 | Bisbee et al. ............... 713/178 |
| 6,243,092 B1 | 6/2001 | Okita et al. ................. 345/349 |
| 6,253,323 B1 * | 6/2001 | Cox et al. .................... 713/176 |
| 6,253,369 B1 | 6/2001 | Cloud et al. .................... 717/5 |
| 6,292,569 B1 | 9/2001 | Shear et al. ................. 380/255 |
| 6,304,937 B1 * | 10/2001 | Farmwald et al. ........... 710/310 |
| 6,311,272 B1 | 10/2001 | Gressel ....................... 713/186 |
| 6,314,425 B1 | 11/2001 | Serbinis et al. ............... 707/10 |
| 6,324,353 B1 | 11/2001 | Laussermair et al. .......... 399/16 |
| 6,327,574 B1 * | 12/2001 | Kramer et al. ................ 705/14 |
| 6,367,013 B1 * | 4/2002 | Bisbee et al. ............... 713/178 |
| 6,415,259 B1 | 7/2002 | Wolfinger et al. .............. 705/8 |
| 6,415,284 B1 | 7/2002 | D'Souza et al. ................ 707/3 |

(Continued)

OTHER PUBLICATIONS

Workflow Management Coalition Workflow Standard—Interoperability Wf-XML Binding by the Workflow Management Coalition, Nov. 14, 2001, Version 1.1, pp. 1-57.

*Primary Examiner*—Calvin L Hewitt, II
*Assistant Examiner*—John M Winter
(74) *Attorney, Agent, or Firm*—Kory D. Christensen; Stoel Rives LLP

(57) ABSTRACT

A transaction receiver obtains a transaction packet comprising at least one document and instructions for processing the at least one document to complete a transaction. Thereafter, a rule parser accesses a transaction policy statement associated with the transaction packet including one or more rules for allowing the at least one document to be electronically signed. A verification agent then determines whether the rules of the transaction policy statement are met, after which a signature inhibitor prevents the at least one document from being electronically signed unless each rule of the transaction policy statement is met.

66 Claims, 9 Drawing Sheets

U.S. PATENT DOCUMENTS

| | | | |
|---|---|---|---|
| 6,421,691 B1 | 7/2002 | Kajitani | 707/500 |
| 6,422,563 B1 | 7/2002 | Fairchild et al. | 273/274 |
| 6,430,538 B1 | 8/2002 | Bacon et al. | 705/9 |
| 6,463,470 B1 | 10/2002 | Mohaban et al. | 709/223 |
| 6,493,731 B1 | 12/2002 | Jones et al. | 707/501.1 |
| 6,502,087 B1 | 12/2002 | Tsuiki et al. | 707/1 |
| 6,505,176 B2 | 1/2003 | DeFrancesco, Jr. et al. | 705/38 |
| 6,505,219 B1 | 1/2003 | MacLean et al. | 707/530 |
| 6,513,059 B1 | 1/2003 | Gupta et al. | 709/202 |
| 6,516,322 B1 | 2/2003 | Meredith | 707/102 |
| 6,516,328 B1 | 2/2003 | Mori et al. | 707/500 |
| 6,581,020 B1 * | 6/2003 | Buote et al. | 702/123 |
| 6,658,568 B1 * | 12/2003 | Ginter et al. | 713/193 |
| 6,659,862 B2 * | 12/2003 | Wong | 463/10 |
| 7,133,846 B1 * | 11/2006 | Ginter et al. | 705/54 |
| 7,143,186 B2 * | 11/2006 | Stewart et al. | 709/245 |
| 2001/0002485 A1 * | 5/2001 | Bisbee et al. | 713/167 |
| 2002/0046144 A1 * | 4/2002 | Graff | 705/36 |
| 2002/0104006 A1 * | 8/2002 | Boate et al. | 713/186 |
| 2002/0107062 A1 * | 8/2002 | Wong | 463/9 |
| 2003/0023559 A1 * | 1/2003 | Choi et al. | 705/51 |
| 2003/0065946 A1 * | 4/2003 | Holliday | 713/201 |
| 2003/0149895 A1 * | 8/2003 | Choo et al. | 713/201 |
| 2003/0204720 A1 * | 10/2003 | Schoen et al. | 713/153 |
| 2003/0204722 A1 * | 10/2003 | Schoen et al. | 713/156 |
| 2003/0236748 A1 * | 12/2003 | Gressel et al. | 705/41 |
| 2006/0085469 A1 * | 4/2006 | Pfeiffer et al. | 707/102 |
| 2006/0090202 A1 * | 4/2006 | Liu et al. | 726/17 |
| 2006/0218651 A1 * | 9/2006 | Ginter et al. | 726/27 |
| 2006/0242075 A1 * | 10/2006 | Ginter et al. | 705/54 |
| 2006/0248016 A1 * | 11/2006 | Ginter et al. | 705/54 |
| 2006/0259766 A1 * | 11/2006 | Rasti | 713/168 |

* cited by examiner

TRANSACTION ARCHITECTURE UTILIZING TRANSACTION POLICY STATEMENTS

CROSS-REFERENCE TO RELATED APPLICATIONS

This application is related to and claims the benefit of U.S. Provisional Application No. 60/357,388, filed Feb. 15, 2002, for "Transaction Package for Digital E-Business," which application is incorporated herein by reference in its entirety. This application is also related to and claims the benefit of U.S. Provisional Application No. 60/377,356, filed May 1, 2002, for "Transaction Architecture for Digital E-Business," which application is incorporated herein by reference in its entirety.

BACKGROUND

1. Field of the Invention

The present invention relates generally to transaction processing systems. More specifically, the present invention relates to a transaction architecture that eliminates paper as the means of memorializing a transaction, replacing it with an e-transaction that is enforceable, automated, auditable, secure, and private.

2. Description of Related Background Art

The use of paper documents in transactions costs U.S. industries billions of dollars annually. In 2001, the life, health and annuity segments of the U.S. insurance industry issued over 25 million new policies, with total premiums of over $442 billion. Insurance regulations require that policy packets delivered to a customer contain a signed application and a signed illustration of the policy. Furthermore, the applicant is required to sign an authorization to allow an insurance company to obtain health and financial information. This is a costly and time-consuming process and is made more difficult by the risk of non-compliance with new personal health and financial information privacy requirements.

Currently, the cost of processing a life insurance application from beginning to end averages $300 per application, with costs fluctuating lower or higher depending on the complexity of the underwriting process. The majority of these costs are incurred whether an applicant completes the process, and are largely the result of printing, mailing, and reviewing paper documents.

The industry average time from customer application until policy issuance is 45 days. After the first two weeks, customer drop-off rates caused by the delays in issuing new policies are approximately 1% per day. Overall policy loss is approximately 30% of all applications submitted. Much of the delay is caused by the mailing of paper documents between various parties.

Insurance is only one industry that is negatively impacted by the use of paper documents to memorialize transactions. Many other industries would benefit from a technique for eliminating paper documents from a transaction, while still ensuring enforceability, security, and privacy.

BRIEF DESCRIPTION OF THE DRAWINGS

Non-exhaustive embodiments of the invention are described with reference to the figures, in which.

DETAILED DESCRIPTION

Figure 1:
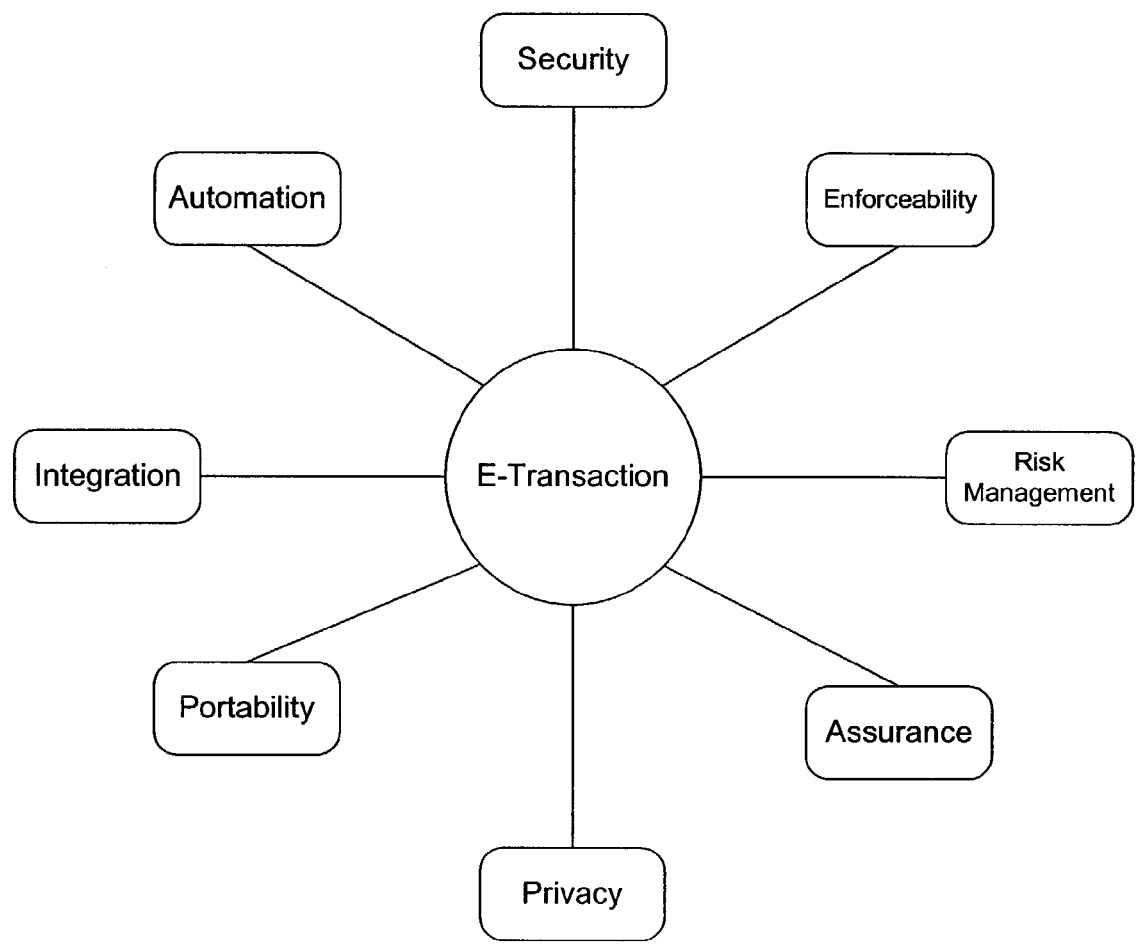
FIG. 1 is an illustration of elements of an e-transaction.

The present invention provides a transaction architecture that solves the foregoing problems and disadvantages. In the insurance industry, for example, the architecture reduces the cost, risk and time required to issue new policies while increasing revenue and profitability. Furthermore, using the architecture, life insurance companies can reduce the time to issue policies from 45 days to as little as 20 minutes, reduce the incremental cost of processing a policy from $300 to as little as $10, and reduce the risk in issuing new policies by obtaining enforceable electronic signatures and by properly protecting personal health and financial information.

With quicker closure times, fewer customers abandon the process, and closure rates increase to grow overall revenues. The result is that life insurance companies can generate more business at less cost, distributors and agents can increase cash flow by receiving commissions faster while better serving their customers.

Of course, insurance is only one example of an industry that would benefit from the principles disclosed herein. The mortgage industry, for example, would also gain substantial benefits from a technique for eliminating paper documents from a transaction.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc. In some cases, well-known structures, materials, or operations are not shown or not described in detail to avoid obscuring aspects of the invention. Furthermore, the described features, structures, or characteristics may be combined in any suitable manner in one or more embodiments.

E-Transactions

Referring to FIG. 1, an e-transaction 100 is an electronic transaction that fully replaces an equivalent paper transaction. E-transactions 100 transform a time-consuming, cumbersome and frustrating paper-based process into a seamless, end-to-end paperless transaction that is legally binding, secure, private and convenient to all parties. It provides a real-time capability to accelerate business closure among multiple parties while overcoming the barriers of distance, geography and time.

In one embodiment, an e-transaction 100 may be characterized by the following eight elements:

Enforceability—Enforceability addresses both legal validity (e.g., compliance with the requirements of the Federal eSign legislation) and the ability to actually enforce the transaction in a court of law (e.g., prove who signed the document, prove that the document hasn't changed since the person signed the document, and prove each event of the transaction).

Automation—Automation addresses the ability to automate both dataflow and workflow. Dataflow is defined as the flow of data in and out of documents, between documents, and in and out of databases. Workflow is defined as the ability to manage processing instructions within documents and transactions, and between transactions and outside systems that may require some type of interaction during the course of the transaction.

Security—Security addresses the ability to manage access to documents and transactions. Security also includes the ability to authenticate the user based on the user's role and on individual security methods, such as unique knowledge (password), a token (smart card), or a biometric (fingerprint).

Privacy—Privacy addresses the ability to dynamically manage access on a real-time basis to private data within a document or within a transaction based on a particular role and security method designated as approved by the disclosing party.

Portability—Portability addresses the ability to move a transaction or a document across multiple computing platforms, geographic locations and company boundaries while retaining the ability to continually execute workflow processes and track the status of the transaction.

Integration—Integration addresses the ability to easily integrate with a number of customer or partner systems such as front-end data collection, database, workflow and document storage systems.

Assurance—Assurance addresses the ability to provide confidence to all participants in a transaction that the integrity of the transaction has not been breached and that all processes were executed per the requirements of the transaction policy statement as evidenced by an integrated audit log of both the transaction and document.

Risk Management—Risk Management addresses the ability to provide a flexible and real-time compliance framework that implements and monitors risk management policies and procedures contained, for example, in a transaction policy statement as an integral part of the transaction.

E-Transaction Architecture

Figure 2:
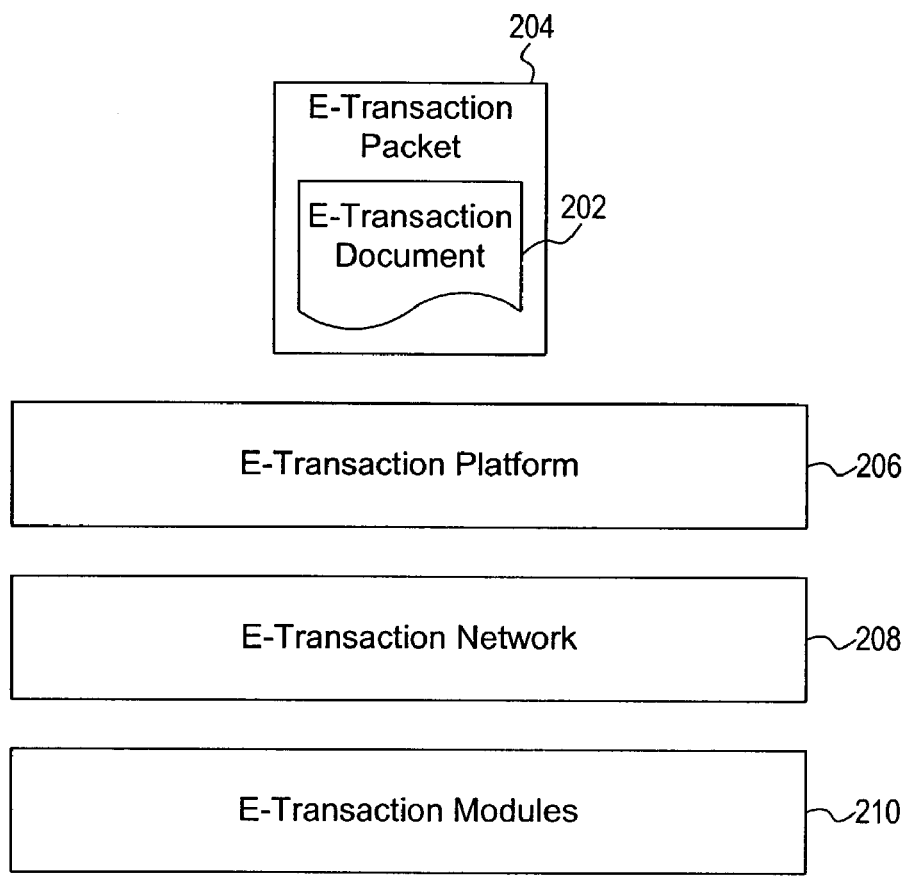
FIG. 2 is a block diagram of an e-transaction architecture.

FIG. 2 broadly illustrates components of an e-transaction architecture 200 for implementing an e-transaction 100 having the elements described above. In one embodiment, the e-transaction architecture 200 includes five components:

e-transaction documents 202
e-transaction packets 204
e-transaction platform 206
e-transaction network 208
e-transaction manager modules 210.

E-Transaction Documents 202

Figure 3:
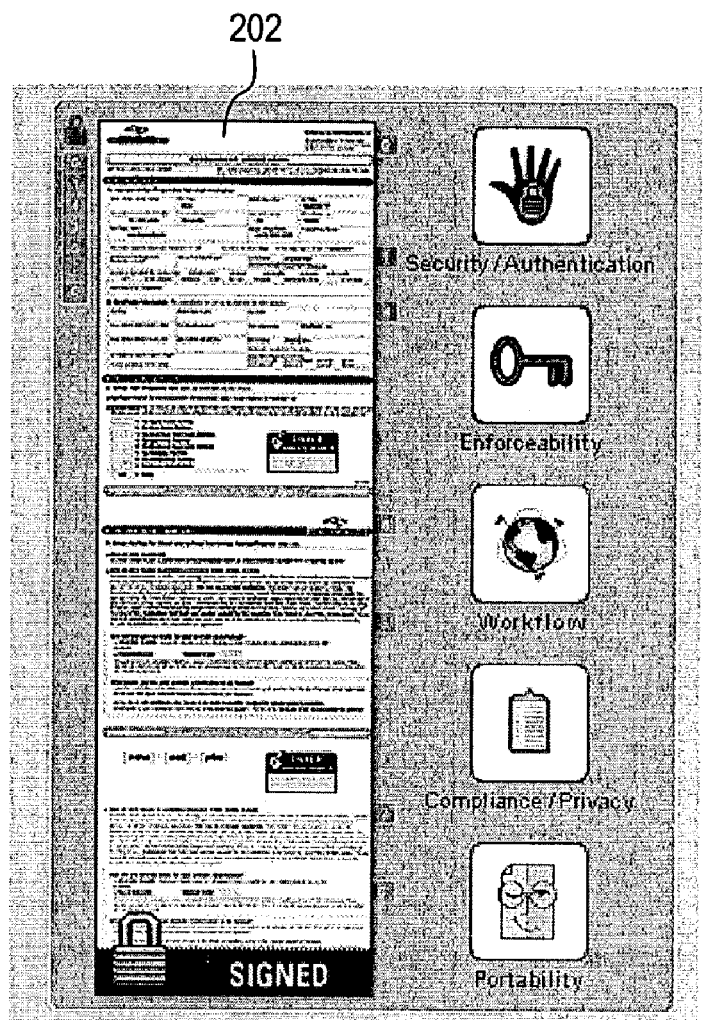
FIG. 3 is an illustration of an e-transaction document.

Referring to FIG. 3, e-transaction documents 202 are intelligent, electronic documents that are capable of taking the place of any paper document used in traditional paper transactions. In one embodiment, e-transaction documents 202 are encoded in the extensible markup language (XML) or another tagged format. As such, e-transaction documents 202 may include XML, HTML or XHTML tags which identify the portions of the document that are variable and/or which might need to be pre-populated or later extracted from the document 202 during processing.

As noted, e-transaction documents 202 are intelligent and include processing instructions (workflow) for completing the associated e-transaction 100. For example, e-transaction documents 202 "know" how to automatically pass data from document to document in an e-transaction 100. E-transaction documents 202 know how to remove data from view for privacy compliance. E-transaction documents 202 understand their relationship with other documents 202 within the same e-transaction packet 204.

E-transaction documents 202 may be contrasted with so-called "dumb documents," which are documents with no tags or implicit workflow, such as image file formats and most proprietary file formats. Some attributes of e-transaction documents 202 are provided below.

Security/Authentication. Each e-transaction document 202 may have roles assigned to the complete document 202 or portions of a document 202. A user is assigned a role and then, after authentication to the system, is allowed to view the assigned portion of the document 202. When the document 202 is kept on a system, the integrity and the security of the document 202 is guaranteed.

Enforceability. As the federal eSign law states, "a sound, a symbol, or a process logically associated with the record and adopted as a signature" is a valid electronic signature. Many "dumb document" solutions could have valid signatures, but they may or may not be enforceable. As an example, e-transaction documents 202 not only support many ways to embed valid signatures, but may go further by tagging the area of the document to which an 'intent to sign' statement is applied. E-transaction documents 202 are more functional and lend themselves to transacting real business in real time. In FIG. 3, the example e-transaction document 202 has two user signatures and a tamper detecting seal.

Workflow. Data required in the e-transaction document 202 may be pre-populated from a data source such as a database, a properties file, or other file on the host computer or any computer on a network. A user can then change, add to, or update the information and sign the e-transaction document 202. When any of these events happen, the workflow can be triggered to spawn other e-transaction documents (e.g., an answer to a question requires more information), spawn a process that is external (e.g., go check on a credit rating or some other action), or extract the data from the e-transaction document 202 and post it to a database or other data repository.

Compliance/Privacy. Under recent privacy legislation (Gramm-Leach-Bliley, HIPAA), a document containing personally-identifiable financial or medical information is not to be viewed by unauthorized personnel. For example, in the medical context, a request for, and the results of, a blood test should not be seen by a clerk who is doing the billing. If the patient's name and the results of the test are on the same page, then the billing clerk should not see the results, but should be able to see the credit card number to be charged. At the same time, the nurse reviewing the results of the test should not see the credit card number. With a "dumb document," these types of transactions are highly problematic. Current systems cannot meet the privacy regulations.

In one embodiment, the e-transactions architecture 200 solves these problems by applying XML style sheet transformations (XSLT) to reveal or hide information within the e-transaction document 202 based upon the role of the person interacting with the document 202. Additionally, under the proposed HIPAA regulations, a log must be kept of everyone who has seen the document for six years. Logging the viewing of "dumb documents" will take major changes to procedures for companies and would require an external database. With e-transaction documents 202, the viewing of the document 202 is logged and placed in the audit log which is tamper sealed within the document. No external database is needed to keep track of the viewers. Furthermore, the viewing of an e-transaction document 202 by someone such as a billing clerk, would no longer be necessary, since the data would be extracted automatically, requiring no human intervention. Such automatic extraction is also logged in a transaction log, as described in greater detail below.

Portability. Each e-transaction document 202 based upon XML is portable and self-contained. It can be moved off of the originating computer and used on another, dissimilar system since the system is Java-based in one implementation. XML is inherently portable and non-proprietary.

E-Transaction Packets 204

Figure 4:
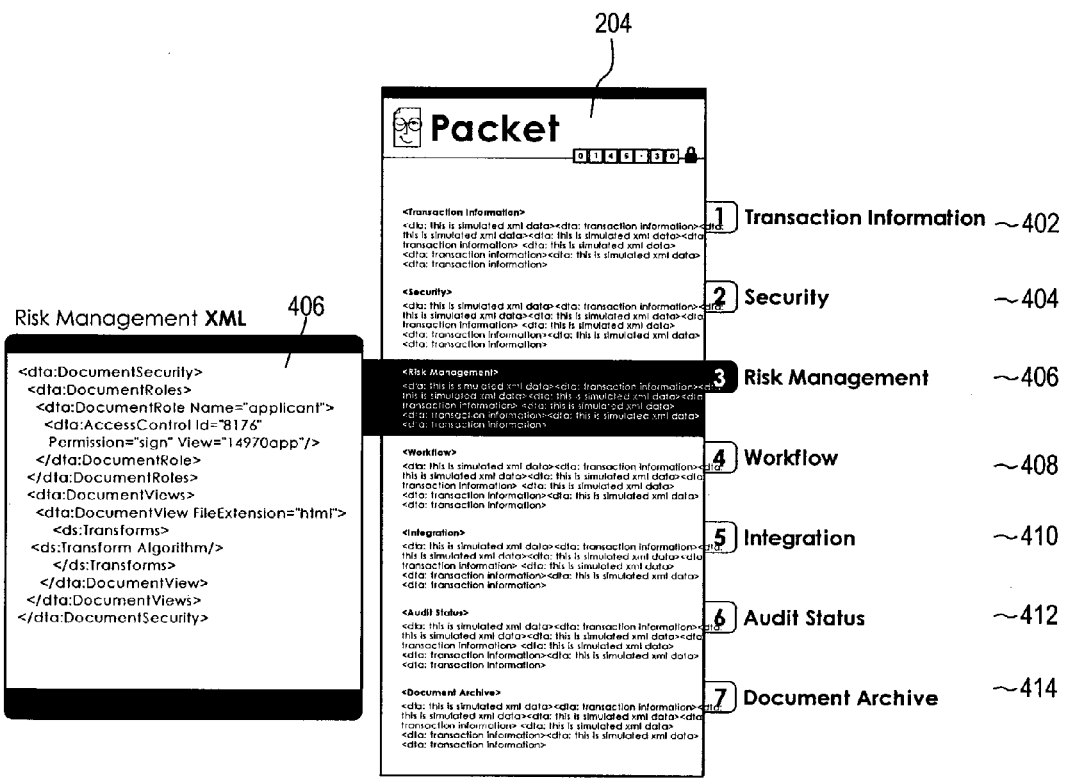
FIG. 4 is an illustration of an e-transaction packet.

Referring to FIG. 4, e-transaction packets 204 may include one or more e-transaction documents 202 and possibly one or more "dumb documents." The packet 204 may be embodied as a self-contained, XML packet that incorporates interpretive workflow, risk management, privacy and security. An XML representation of a packet 204 is provided below.

<dta:Transaction Id=" "
xmlns:dta="http://www.nxlight.net/DigitalTransactionArchitecture/2.0">
<dta:TransactionProperties Builder="3.0.0903">
<dta:TransactionSecurity>
<dta:TransactionManager Order="sequence">
<dta:TransactionLog>
<dta:Document Id="nx-6316724901602352 96">
</dta:Transaction>

Each e-transaction packet 204 allows transactions to flow across platform, company, and geographic boundaries while maintaining status, workflow and privacy functions. As shown in FIG. 4, the e-transaction packet 204 may include various sections, including a transaction information section 402, a security section 404, a risk management section 406, a workflow section 408, an integration section 410, an audit section 412, and a document archive section 414.

Transaction information section 402. The packet 204 contains a namespace declaration followed by the elements of the e-transaction 100. The first element is the header which contains the meta information or properties of the transaction 100. Customer specific information may also be placed in this section.

Each transaction 100 may be uniquely numbered using, for example, a globally unique identifier (GUID). The transaction information section 402 may include a reference to a controlling, transaction policy statement (described in greater detail below), as well as a reference to a creating server with licensing data and/or a controlling DTD or schema.

Security Section 404

The security section 404 provides details about security, i.e. participant roles and required levels of authentication. Each role may have "viewing" "editing" and/or "signing" privileges for each part of the document 202. Associated with each role will be the authentication required. The devices required for authentication may also be specified, e.g., "something you know" like a password or PIN, "something you have" like a smart card or USB token, and "something you are" like a retinal scan, fingerprint, voice print or other biometric sample. Each role in the transaction 100 may have a different level of security specified and the corresponding authentication required. For example, the applicant for an insurance policy may not be required to have anything; a simple click may be adequate for signing the application. However, the insurance agent may be required to use a USB token to witness the signature by the applicant. All such settings are variable, and an administrator setting up the e-transaction packet 204 will make the decisions.

Third party authentication is also allowed with this feature. The e-transaction packet 204 can contact the Liberty Alliance (www.proiectliberty.orq) to authenticate a participant, the MS .Net Passport (www.passport.net/Consumer), or a consumer credit reporting company such as TransUnion or Equifax. Each of these can be selected by an administrator depending upon cost and need.

Risk Management Section 406

Each e-transaction 100 is a part of a larger activity in business, and each may not require the same risk mitigation. As described in greater detail below, a "transaction policy statement" is developed for each e-transaction 100 and implemented in this section.

Workflow Section 408

Workflow is traditionally a set of instructions on a server for a specific type of document. For example, in a conventional system, a purchase request might be routed by the server to each individual who must approve the purchase. When all approvals have been gathered, the system will issue the purchase order. If someone is unavailable, however, the documents might sit in his or her e-mail inbox indefinitely. If the purchase order is emailed to another disparate server, the entire process might break down as the purchase order did not originate on that system and might not be the type of document that is understood by the system.

E-transaction packets 204, on the other hand, not only contain their own interpretive workflow, but can easily move from server to server when necessary, inform the server that they are there, and present high level requests that are interpreted and implemented as low level commands. For example, a "smart purchase order transaction" knows of all the individuals who will need to approve the purchase request. The server interpreting that high level request would extract data from the e-transaction packet 204 to see what and who should do the approval, and then place the transaction where the approver can come and approve the request. The documents are not emailed to the approver where they could be lost or stuck, but rather, an e-mail could be sent with an appropriate URL for the approver to come to the server and approve the request.

Integration Section 410

Within an e-transaction, data such as name, address, etc., can come from a variety of sources. After the transaction is finished, the data may be moved to one or more databases. The integration section 410 facilitates this flow of data and is described in greater detail below.

Audit/Status Section 412

The audit log (also referred to herein as a transaction log) assists with complying with various privacy laws. Within the audit log, all activities, such as document creation, signing, viewing, printing, workflow events, data automation, etc. are logged within the tamper proof seal of the document 202 or transaction packet 204. Access to documents 202 is role-based and the transaction packet 204 knows the requirements, as stated in the transaction policy statement, for each role. The authentication of the person requesting access is handled by each server. If an existing database of persons exists in the enterprise, then an LDAP call could be made to authenticate a known person.

Document Archive Section 414

For each e-transaction 100, the repository of the documents 202 can be specified. Statutorily, some documents must last forever (property deeds), some must last for the life of the loan (30 year mortgage notes) plus seven years (for the IRS), or six years for HIPAA compliance. An archive can be specified external to the server. Documents 202 can also be rolled out to various media (CD-RW or DVD-RW, tape, etc.), so they are no longer on the disk taking up space when they are no longer needed for instant access. Of course, they can be rolled back into the system as needed.

E-Transaction Platform 206

Figure 5:
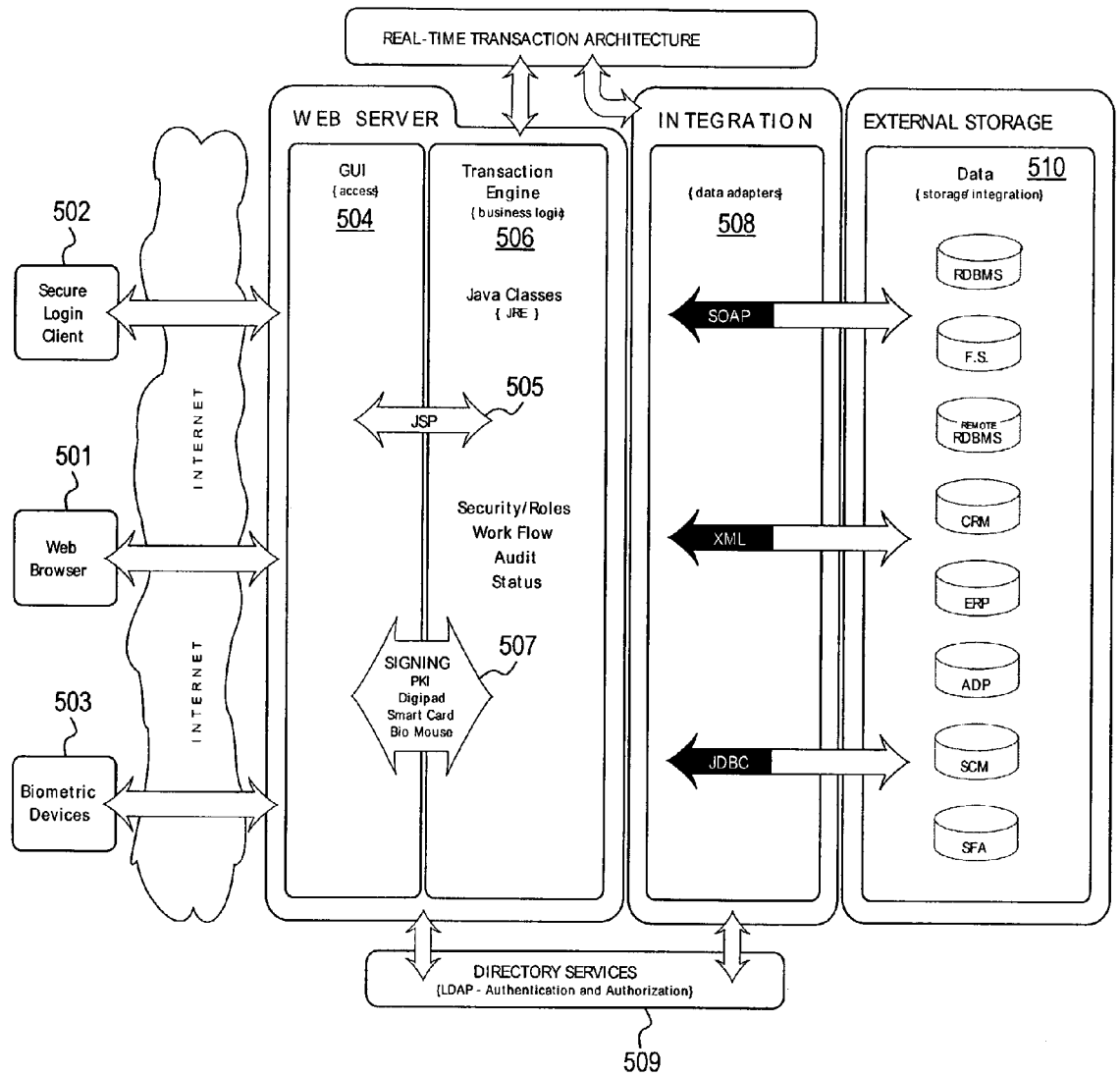
FIG. 5 is a block diagram of an e-transaction platform.
Figure 6:
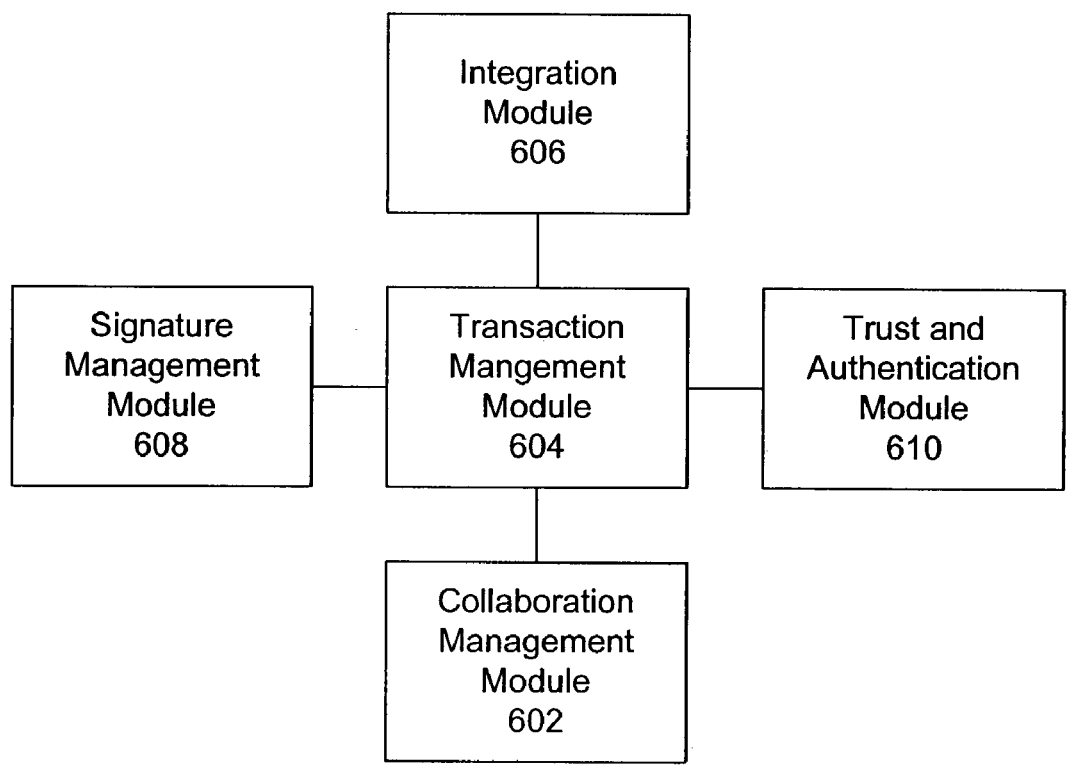
FIG. 6 is a block diagram of a number of e-transaction modules.

Referring to FIG. 5, the e-transaction platform 206 interprets the e-transaction packet 204 and provides the infrastructure for processing e-transactions 100 regardless of whether they are initiated at the web, enterprise or desktop environments or whether they occur on-line or off-line.

The e-transaction Platform 206 may use an "N-Tier" architecture. A graphical user interface 504 utilizes a web browser 501 over an optional secure SSL connection 502 to communicate with the user. If required by the system administrator who has set up the e-transaction 100, biometric devices 503 may also be required to authenticate the user to the system before an e-transaction 100 is presented. Once logged in the graphical user interface system 504 communicates via Java Server Pages (JSP) 505 between a transaction engine 506 and the user's web browser 501. The transaction engine 506 interprets the e-transaction Packet 204 according to a transaction policy statement (e.g., security 406 and risk management 408). As the process proceeds, the documents 202 may be prepared for signature and utilize the signing module 507 which may utilize various methods for electronically signing the document such as PIN or Password (something you know), a smart card or USB token (something you have) or the biometric (something you are). Some implementations of the transaction engine 506 may utilize directory services 509 via LDAP for the authentication of users such that the individual data of a user is stored in the directory services 509 and not in the transaction engine 506.

The transaction engine 506 updates the e-transaction Packet 204 with audit/status items 412, executes the workflow 408 and performs the integration 410 as directed by the eTransaction Packet 204.

Some of the documents 202 contained in the e-transaction Packet 204 may have input items that can be retrieved from an external database and not require that the user input that information again. The transaction engine 506 may communicate the need for information, specified by the integration 410 and the document to which it should be directed to the Integration data adaptor 508.

The data adaptor 508 connects to the external database 510 to obtain that information and place it in the document 202. The connection between the data adaptor 508 and the external storage 510 may utilize SOAP (Simple Object Access Protocol), XML (eXtensible Meta-Language), JDBC (Java DataBase Connectivity) or other such industry standard methods. The External Storage 510 may be a variety of storage types including RDBMS (Relational DataBase Management Systems), the file system, CRM (Customer Relationship Management), ERP (Enterprise resource planning), ADP (Automated Data Processing Corporation for payroll and other benefits), SCM (Supply chain management), SFA (Sales Force Automation) and/or others such systems which store information.

During the processing of an e-transaction 100, there may be data entered, calculated or derived from input of the user that must be communicated to external systems. The same Integration 410 may utilize integration data adaptors 508 to communicate out to one or more of the external storage 510.

As noted, the e-transaction platform 206 may use an "N-tier" architecture with emphasis on functionality, portability of the code base (Java), standards (XML, SOAP, JDBC) and scalability. For example, hosted on a SUN Enterprise 4500 system, the system is capable of processing in excess of 1 million transactions in an 8 hour day. Even on a modest PIII 700 MHz machine, a fully functioning system can perform a transaction every 2 seconds (nearly 15,000 transactions in an 8 hour day). A server may be run with Java 2 Runtime Environment, Apache/Tomcat 4.x and Oracle 8.1 (recommended for servers but not required for the desktop version) to which Java Classes and JSPs for the system are added.

The e-transaction platform 206 may utilize the Jakarta Struts Framework 1.1 for the development of the application. Struts is an open source project sponsored by Apache and is an implementation of the Model View Controller (MVC) design pattern. This MVC separates the presentation layer from the transaction/data layers. The messages are stored in resource files so that internationalization is facilitated. As Java is inherently multibyte characters, the e-transaction platform can run with any Asian language.

E-Transaction Network 208

E-transactions 100 are portable and can be used across many platforms. Each company utilizing the e-transaction platform 206 can create their own web of servers. If they wish to join a larger community of users then they can join an e-transaction network 208. Just as TCP/IP depends upon DNS servers to guide the packets through the internet, in multi-server, cross industry solutions, the e-transaction packets 204 may use the e-transaction network 208 to guide them to the requested server. The e-transaction network 208 also provides the ability to register transactions, register servers and services, and to register users. If an e-transaction 100 is registered, it may be assigned a GUID so that it can be accounted for and never confused with any other e-transaction 100. Similarly, each server and user may also have an assigned GUID.

The e-transaction network 208 may also provide long-term storage of the transactions 100. For HIPAA compliance, each document with personally identifiable medical information must be kept for six years along with the log of everyone who has viewed or processed it. Rather than requiring each company using the system to store such documents for this length of time, the e-transaction network 208 allows documents to be migrated from active servers to the e-transaction network 208 for storage. The e-transaction network 208 also provides for the retirement of documents 202 as the time period for keeping them expires. With secure offsite storage as an option, the e-transaction network 208 provides the highest assurance that transactions can be retrieved at will in the future.

The e-transaction network 208 enables the delivery of e-transactions 100 as hosted Web Services and provides an environment for customers to build business relationships across industries worldwide and to fundamentally change current business processes. The e-transaction network 208 connects all participants across geographic boundaries and industries into a real-time electronic web of e-transactions.

The e-transaction network 208 also provides for the creation of new webs of business activity connecting the different parts of an industry together. For example if the system were sold to an insurance company A, an underwriting service provider B, a pharmaceutical database company C, a lab result company D, and an inspection company E, then the following scenario is possible.

1. An agent meets with the applicant for life insurance either in person or over the phone and obtains the basic information for the application, which is then electronically signed by the applicant including an "Authorization for Release of Information."
2. The agent at some point in the day connects to the Internet and the application and all related documents are transmitted to the e-transaction network 208 and then to insurance company A.
3. The e-transaction network 208 then routes the request for underwriting along with the "Authorization for Release of Information" to the underwriting service provider B.
4. At company B, the request is forwarded to the pharmaceutical database company C.
5. At company C, the "Authorization for Release of Information" is validated to be sure that it has not been tampered with. If this is so, then the request for pharmaceutical data is processed and returned to company B.
6. Company B then uses the pharmaceutical data in its inference engine to determine the rating of the applicant and forwards that information back to company A.
7. Steps 3-6 may take place in just a few minutes. If the results indicate that more information is needed to make an underwriting decision, the request for information is forwarded by the e-transaction network 208 to inspection company E and/or lab result company D, who also validate the request, and if data is needed, gather it and then forward it to Company A for underwriting.
8. The Agent receives feedback in just a few minutes as to the state of the policy issuance. If all things are clear, the policy is issued at that time. If more time is needed, then an estimate is given.

E-Transaction Manager Modules 210

Referring to FIG. 5, completing an e-transaction 100 may be accomplished using a number of e-transaction manager modules 210. In one embodiment, the e-transaction manager modules 210 may include the following:

Collaboration manager module 602: creates the e-transaction packet 204

Transaction manager module 604: processes the e-transaction 100

Integration module 606: handles integration with outside systems

Signature management module 608: provides functionality for verification of signatures and signing of documents 202 in the e-transaction 100

Trust and authentication module 610: stores the finalized e-transaction 100, manages the security framework, and can serve as a registry.

In one embodiment, the above modules are implemented locally on a server and/or remotely at a hosted site. Each may be implemented using any suitable combination of hardware and/or software and will be described in more detail below.

Collaboration Manager Module 602

The collaboration manager module 602 creates and edits e-transaction packets 204 and the e-transaction documents 202 that are included therein or referenced. In one embodiment, the collaboration manager module 602 performs the following functions:

Creating and versioning documents 202

Creating e-transactions 100 via document assembly

Comparing versions

Utilizing video and audio over the internet to whiteboard documents 202 and make changes.

The collaboration manager module 602 creates, edits, versions and allows collaboration on documents 202 and e-transactions 100. Each component of the document 202 may be numbered (using a unique numbering scheme) and may be registered with the e-transaction network 208. As a document 202 is assembled from its numbered components, it also receives a unique number. Each time the document 202 is edited, the number is modified.

At some point in time, the documents 202 may be viewed and compared to previous versions. This is sometimes called redlining. The comparison software utilizes the numbers on each component of the document 202 to begin the comparison. If a component of the document 202 has been numbered and the number is the same in each version, then the system knows that the particular component has not changed. When the numbers are different, then the components are compared for differences. The comparison is localized to those components that have changed, thus providing a much faster comparison.

If a participant in an e-transaction 100 wishes to review the document 202 with other parties, such collaboration can be done via video or audio with the document 202 whiteboarded. Changes made by the group may be noted in each segment of the document 202.

Transaction Manager Module 604

The transaction manager module 604 performs many of the processing functions associated with an e-transaction 100, including, for example:

Logging audit of actions

Reporting status

Managing views of the documents 202

Interpretive workflow using an e-transaction packet interpreter

Tools to create e-transaction packets 204, including an e-transaction map

Enforcing transaction policy statement compliance

Numbering e-transactions 100 and participants, including communicating with the e-transaction network 208 to register transactions 100.

In one embodiment, the transaction manager module 604 is implemented as an interpretive workflow server. Just as TCP/IP takes the intelligence from the router and puts it into the packet, so with transaction manager module 604 the workflow steps are placed into the e-transaction packet 204 rather than being located in the server itself. This means that instead of going from person to person on a server as in conventional workflow, the e-transaction packet 204 can go from server to server to accomplish its workflow.

An example of this would be a real estate closing transaction. The documents 202 that might be needed in such an e-transaction 100 include, for example, disclosure documents, a grand deed, and a promissory note. The disclosure documents may be required by law to be included in the packet maintained by the lender.

The grant deed is a document 202 that must be recorded by the county. Since there are 3,619 counties in the U.S. that record deeds, it is unmanageable to include the instructions for each of these in the grant deed, as would be required by conventional workflow techniques. Rather, an instruction to record the deed is included in the e-transaction packet 204; one attribute of the instruction is the location or county name. The server upon which the transaction is completed takes the document 202 out of the current e-transaction packet 204 and initiates a new sub-transaction for recording. It requests, from the e-transaction network 208, the capability of the county in which it was to be recorded. The e-transaction network 208 responds with the server name and IP address, and the new e-transaction packet 204 is sent to that server; the recording instructions are then added to the e-transaction packet 204 and interpreted by a local transaction manager module 604. If no entry in the e-transaction network 208 services directory is found, then the document 202 is printed out and sent to the county for recordation on paper according to conventional methods.

In a similar manner, the promissory note is removed from the e-transaction packet 204 and made into a new sub-transaction packet 204. The sub-transaction packet 204 is submitted to other parties according to an agreed-upon format, such as an XML format for purchasing promissory notes. If the sub-transaction packet 204 is not already in the agreed-upon format, the system transforms the packet 204 to the desired format before submitting it. Upon receipt of the packet 204 at the other parties' servers, the note is processed.

To assist the administrators of business process and workflow, the system further includes tools for developing process maps that transform directly into XML files for loading into the e-transaction packet 204. These process maps are diagrams of process for each document 202 or set of documents 202 in the packet 204. The graphical representation includes people specified by roles, actions they may or are required to take, automated (server-based) actions or unattended processing, and the scattering and gathering of documents 202 during the process. Scattering divides up the packet 204 into new packets 204, each having its own process map. Gathering brings together several packets 204 that may or may not have been scattered.

These maps then create XML instructions that can be interpreted by the transaction manager module 604. In one embodiment, a unique identification number (GUID) is assigned to each e-transaction packet 204, document 202, role, and person. When the e-transaction packet 204 is transmitted from one server to another, it is registered with the e-transaction network 208. In this case, each of the unique numbers is also registered. If the user is already registered, then his or her number is reused; however, a new role may be generated, since roles are transaction-dependent.

The view of the document 202 provided to each user is dependent upon his or her current role. To comply with privacy standards, documents 202 containing personally identifiable information and/or sensitive data such as health information or financial information are not disclosed without permission. The system provides a mechanism for enforcing such privacy standards by simply turning off the data that should not be seen by a particular role. Some privacy regulations further stipulate that all access to a document 202 be recorded. The system provides an audit log that enables such recordation. As described in greater detail below, the transaction policy statement can include compliance rule that causes the system to record, in the audit log, the particulars of each access to the document 202.

Integration Module 606

The integration module 606 handles integration with outside systems and may perform the following functions:

Pre-populating documents 202 with information from databases through an answer file
Extracting data from documents 202 for databases to the answer file
Inserting instructions into the e-transaction packet 204 for execution on a selected server
Locating next server and/or process for an e-transaction 100.

The answer file is a component of the e-transaction packet 204. In one embodiment, the answer file is an XML-tagged set of data that is used in all of the documents 202 associated with the e-transaction 100. To illustrate its use, the following example is presented, depicting an application for a human resources department. A new employee, Jim, starts at ABC Company. A human resources representative creates an account on the system for Jim, and allows Jim to access the account via an internal web server. Jim logs in and is presented with a personal fact sheet, which he then fills out with his name, address, phone number, spouse, children, social security number, etc. The data flows from this fact sheet to the answer file, and from the answer file to the corporate database. The data then propagates to all of the documents 202 Jim has to fill out, such as, for example:

INS I-9
IRS W-4
Health Insurance Application
Dental Insurance Application
401(K) Application
Cafeteria 125 Plan
Non-Disclosure Agreement
Non-Compete Agreement.

While this list may not be exhaustive, it is meant to detail a sampling of the multitude of forms that are filled out by a new employee. Several of these documents 202 also interact with the accounting database; thus, when Jim has completed the documents 202, a file is created for the accounting system.

Some forms, such as the INS I-9, require that an authorized company representative review documentation; such forms cannot be completed without some documents 202 being passed from one party to another. Other forms can be completed without such review. For example, the W-4 form requires a name, address, social security number and the number of deductions or the dollar amount to be deducted each month. Jim fills out the number of deductions or the dollar amount, and the rest of the information is filled in automatically based on information from the answer file. As Jim signs the W-4 form, the entered values are copied from that document 202 into the answer file.

The next document 202, the Health Insurance Application is also automatically filled in with all of Jim's information from the fact sheet. Jim may have to specify some data as required for the document 202, but the basic information is pre-populated for him. As each document 202 is signed, it is stored in the system as a complete document 202 (similar to a paper document in a file cabinet), but the processing of the documents 202 is automatic.

At the end of the session, as Jim completes the last form, a file is created for the accounting system with information about each deduction. Additionally, the 401(k) document 202 and the insurance applications can be automatically routed to the appropriate providers, either electronically as an e-transaction 100 or printed and mailed.

If the provider has a compatible system, then a module at Jim's company can contact that system and provide the sub-transaction, which would be available for processing. For example, the system can take the 401(k) application out of the e-transaction 100 that was created for Jim and make it its own e-transaction 100. If there are many e-transactions 100 to be transmitted to the 401(k) provider, the system can batch them up and send them at periodic intervals, such as once per day, once per week, or the like.

The progressive e-transaction 100 arrives at the 401(k) provider's system, and its server inserts the instructions needed and then processes the e-transaction 100. Jim's original e-transaction 100 thus becomes a new e-transaction 100 on the 401(k) provider's system. This interpretive workflow facilitates movement of e-transactions 100 from system to system.

In order to identify the proper destination for an e-transaction 100, the system uses a registration feature for servers that are to process e-transactions 100. Each server is registered with a unique identifier, and the registry is stored on the e-transaction network server. This is a publicly available server that is maintained to coordinate e-transactions 100. To move from one server to another, the integration module 606 determines that another web service is needed, and queries the e-transaction network server for a list of providers of that service. In this example, Jim's company has a contract with only one provider of 401(k), so the integration module finds this information on the e-transaction network 208. The e-transaction 100 is then registered with the e-transaction network 208 and given a unique number for tracking. In one embodiment, not all e-transactions 100 are tracked or registered, but tracking takes place when an e-transaction 100 is moved from one server to another across company boundaries, or even within a company if desired. A unique number is given to the e-transaction 100 as it is moved from one server to another. The originating server and the e-transaction network 208 are kept up to date on the status of the e-transaction 100 by messages from the current integration module server (described below) through the e-transaction network 208 to the originating server. This data is added to the audit trail or log of the originating e-transaction 100.

Users of the system can also be registered with the e-transaction network 208. When a registered user is to participate in a transaction 100, he or she can be authenticated by the trust and authentication module 210, as described below, and have his or her unique identifier associated with him or her. Then, all e-transactions 100 that are registered and in which they participated can be searched for status.

The system is able to handle the case where the e-transaction 100 may start on a disconnected server or even on a desktop computer that is not connected to a network. At some point in the e-transaction 100, the server or computer is connected to the Internet, or the e-transaction 100 is sent to a server that is part of the e-transaction network 208, whereupon the e-transaction 100 becomes visible to the e-transaction network 208, and if desired can be registered.

The transaction policy statements that are implemented by integration module 606 depend upon the e-transaction network 208 for some of the monitoring required to meet specific legal compliance issues. When a transaction 100 is marked such that monitoring or compliance is required, a disconnected system may not be allowed.

The integration module 606 extends the e-transaction platform 206 to permit communicating to/from external data sources and processes. For example, the integration module 606 may exchange data using JDBC, LDAP, XML, etc. Furthermore, the integration module 606 may trigger a customer specific process.

In one embodiment, the integration module 606 may interact with an XML document 202 that contains non-NxLight workflow commands, e.g. MISMO. This feature allows the integrator to implement the interface DatastoreAdaptor. Illustrated below, this interface provides one method for importing data and one method for exporting data.

```
com.nxlight.engine.workflow.DatastoreAdaptor
public HashMap importData(HashMap map, User user,
    DocumentInfo docInfo) throws WorkflowException;
public void exportData(HashMap map, User user, Docu-
    mentInfo docInfo) throws WorkflowException;
```

In one embodiment, data values may only be extracted or inserted into known HTML input fields, any XML tag or attribute in the dataset. Exchanging data begins with a TransferData command. The source parameter identifies where data is coming from, and the target parameter identifies where data will be sent. The source or target parameters may contain a DocumentAdaptor (used to reference a single document), TransactionAdaptor (used to reference every document 202 in the transaction) or StorageAdaptor (used to invoke a Java class).

When StorageAdaptor is the source parameter, workflow will call the importData method to collect any data. As the target parameter, workflow will call the exportData method to output the data.

Database Import Example:
```
<TransferData>
  <Source>
    <StorageAdaptor Provider="my.sample.Datastore"/>
  </Source>
  <Target>
    <DocumentAdaptor Document="TestDocument-1"/>
  </Target>
</TransferData>
```

Document-to-Document Example:
```
<TransferData>
  <Source>
    <DocumentAdaptor Document="TestDocument-1"/>
  </Source>
  <Target>
    <DocumentAdaptor Document="TestDocument-2"/>
  </Target>
</TransferData>
```

Signature Management Module 608

The signature management module 608 provides functionality for verification of signatures and signing of documents 202 in the e-transaction 100. In one embodiment, the signature management module 608 performs the following signature management functions:

- Allowing users/processes to sign documents 202 in whole or part, including enveloping signatures, sibling signatures, and hierarchical signatures
- Verifying integrity of the document 202 and signatures
- Allowing for D-Sign and E-Sign to be mixed in documents 202
- Checking Certificate Revocation List (CRL) to validate certificates used
- Displaying the signature as directed in the transaction policy statement
- Displaying consent dialogs at appropriate times
- Displaying and recording intent for signatures
- Displaying document 202 for approval, acknowledgement of viewing, and signing.

Depending on the context of the e-transaction 100, the signing of documents 202 may require more than just placing the digital signature into or around the document 202. Some legislation requires that parties to a transaction agree to do business electronically. Specific requirements may include, for example:

- Must provide opportunity to consent to use of electronic records and electronic signatures (either selective or global)
- Must be obtained by electronic means and reflected in an electronic record electronically signed
- Must be knowing and informed
- Must occur before delivery of electronic records or execution of transaction
- A pre-consent disclosure that provides a clear and conspicuous disclosure of:
  - Right to have documents provided on paper
  - Right to withdraw the consent after it has been given
  - The consequences of withdrawing consent, e.g., fees and whether withdrawal will result in termination of the transaction
  - The scope of the transaction covered by the consent The procedures for withdrawing consent
The procedure and fees for obtaining paper copies
Hardware and software requirements for accessing and retaining records.

When executing electronic records, therefore, specific requirements may include, for example:

Must establish authority of individual to sign
Must show that a sound, symbol or process was used as electronic signature
Must show that signature is logically associated with electronic record
Must show attribution of signature (associating identity with signature)
Non-repudiation
Must show intent to sign and provide evidence thereof.
Must show the purpose for which the document 202 was signed:
  Attesting to accuracy of the document 202
  Confirming receipt or review of the document 202
  Confirming agreement with terms of the document 202.

One skilled in the art will recognize that the above requirements are merely exemplary, and the particular requirements for a given transaction may depend upon the jurisdiction, applicable legislation, and the nature of the transaction.

As described in greater detail below, the system implements such requirements by a transaction policy statement. In one embodiment, the transaction policy statement is an XML control file that specifies what requirements the e-transaction 100 must meet. If the consent attribute is activated, then the implementation displays, in a dialog box, a statement of consent. The user is required to press an OK button to dismiss the dialog box to continue using the system. An audit item is then created and added to the audit log specifying the date and time, along with the verbiage from consent dialog. This audit item becomes part of the transaction record that asserts that the user was noticed and accepted the consent information. The pre-consent disclosure is handled in a similar manner and recorded in the audit log.

In some jurisdictions, a relevant component in determining enforceability of an electronic transaction is the intent for which a document 202 is electronically signed. As specified in the transaction policy statement, the intent may be displayed in the document, as a predefined dialog box, or an input field where the user of the system must specify their intent in signing the document 202. Each of these may also trigger the placing of the intent in the audit log along with the date and time stamp when it occurred.

In one embodiment, the signature management module implements consent and intent as directed by the transaction policy statement. Additionally, the "sound, symbol or process" used to sign a document 202 may also be directed by the transaction policy statement.

In one implementation, the system uses five levels of security as applied to signatures:

TABLE 1

| Level | Authentication | Signing |
| --- | --- | --- |
| 1 | None/Username and Password | Click |
| 2 | Username and Password/Token | PIN |
| 3 | Username and Password/Digital Certificate | Digital Signature |
| 4 | Username and Password/Biometric Sample | Biometric |
| 5 | Combinations | Combinations |

Depending on the amount of authentication that will be done to identify the individual signing the document 202, an e-signature appropriate to the specified security level is applied. In this way, the system is able to implement different security levels for different participants.

For example, for a life insurance application where participants include the applicant, the agent, and the company, authentication may take place as follows. The applicant is present with the agent, so that the system can rely on the agent to authenticate the applicant. Thus, the system requests the first level of authentication for the applicant, with a corresponding click to assert that the applicant agrees to the signing of the application. For the agent, the insurance company may require the fourth level of security, so that the agent is authenticated using a biometric device, as well as username and password. The resulting insurance policy is issued with the company's digital signature (level 3). In one transaction, the transaction policy statement may have specified three different levels for the various roles used.

The transaction policy statement can further specify whether the document 202 is to be signed with an enveloping signature, which is a hierarchy of signature where the order is controlled. For example, one signature (referred to as a child signature) may be required to always take place before the parent signature is allowed; alternatively, the invention may implement a sibling signature scheme where all signatures are at the same level. These may also be mixed in the document 202. For example, for a deed of trust, the signature scheme may specify that the three borrowers are the child signatures of a parent notary signature. The order that the borrowers sign is of no consequence, but all three must sign before the document 202 can be notarized.

In one embodiment, before the system applies a participant's signature, it verifies that all previously applied signatures are valid and that the current participant has been authenticated to the level specified by the transaction policy statement for this signature. If the participant is not at the required level, then he or she is given an opportunity to upgrade his or her authentication to the necessary level; if they do not, then they are prevented from proceeding with the transaction.

In order to implement the various security levels, the system permits considerable flexibility in the mixing of electronic signature types. To the participant, it appears that each signature type is different, but to the system they are treated similarly. Specifically, in one embodiment, the system always uses a digital signature regardless of what the participant uses. If the participant does not use a digital signature, then the system utilizes the server's private key for SSL and embeds the certificate from that key in the document 202. The system also includes data and/or information from the participant before applying the digital signature. For a click sign, the information specifying who clicked and when is added to the document; the system then digitally signs the document 202. Since the digital signature is tamper-evident, it provides verification that the document 202 has not been changed before the next signature is added.

For a "picture" signature (one in which a still frame image of the person or an image of their fingerprint is taken of the person and adopted by them as their signature), the image file containing the signature is base64-encoded and added to the document 202 at the point where the signature is specified; the digital signature is then executed. All of the bits of the image are included in the document 202 and, when hashed by the digital signature, become part of the document 202. In a similar fashion, a WAV file of the participant agreeing to the document 202 for a signature by sound or an AVI video clip of the person agreeing by video can also be base64-encoded and added to the document 202 before applying the digital signature. In this way, the system can mix participant signatures of different types but handle them in a consistent way that always protects the document 202 against unknown changes.

The signature management module 608 maintains the integrity of the document 202 through signing by various means, according to techniques that are well known in the art.

Trust and Authentication Module 610

The trust and authentication module 610 stores the finalized e-transaction 100, manages the security framework, and can serve as a registry. In one embodiment, the trust and authentication 610 module manages the security framework for:
- Users
- Roles
- Certificates
- Identification/Authentication—Verification.

The trust and authentication module 610 may also stores documents 202, including:
- Registry for "Single Authoritative Copy"
- Archive documents 202 for fixed period of time.

Finally, the trust and authentication module 610 may perform monitoring functions, including:
- Monitoring remote systems periodically for compliance with laws such as HIPAA, GLB, and E-Sign
- Monitoring transactions as they occur, for compliance with laws.

The security framework provided by trust and authentication module 610 solves the following problem. Suppose a company implements security via voice recognition and builds the system based upon the SDK provided by a voice recognition company. Use of this type of system generally requires that users be enrolled; in other words, voice samples are taken several times to find an average for the individual which is used as a template against which any matches are made. When the system is in use, the user provides the phrase, which is matched against stored templates to find the user and identify him or her as one who is allowed to use the system. Further, the system may be designed to allow the voice recognition to be used in conjunction with a digital signature. In general, this requires custom programming to release the private key for the digital signature for each application.

Under a conventional security implementation, if the company subsequently decides to use fingerprints instead of voice recognition, substantial overhaul may be required. This many include redevelopment and redeployment of the security infrastructure using the fingerprint SDK. Furthermore, users generally would have to be re-enrolled using the new security scheme. The user enrolls by providing the fingerprint several times to the software, whereupon the software will store a template for future identification. The SDK for each system may be different, and the company might not be able to reuse any programming from the old security architecture. Under a conventional security implementation, if the company later decided that they wanted a combined system of fingerprint and voice, then another substantial programming effort would be needed.

The security framework of the present invention helps solve this problem. It is based upon a secure database on a local server with a backup server at a remote location. The secure database stores the following information:
- User Store
- Something Store
- Know
- Have
- Are
- Location
- Jewel Store
- Passwords
- Private Keys
- Certificates (X.509v3)

The User Store contains basic information about each potential user of the system. This information is obtained when the person is enrolled, or from an existing database of users somewhere in the network (for example, an LDAP call may be used to retrieve such information). The User Store has the minimum data that the company wishes to keep on the individual, usually the name, address or location, department, organization, and the role they have in transactions. The role may be, for example, manager, company officer, employee, or the like. There may be one or more roles per person.

The Something Store contains information that allows the user to access the system. The store can operate in one of two modes. First, it can operate in an identification mode. This is a one-to-many search of the database (1:N). The user of the system provides only a "something," and the system then searches the database for a match to identify the user. For example, a user may say the word "Open." The user's voice is sampled and compared to templates stored in a "Something You Are" voice store. Once the user is identified, the system references back to the user store and the jewel store to obtain the user id and password, and then logs the user into the system (single sign-on operation). Alternatively, a user may give his fingerprint sample on the device. A similar operation would take place: the sample would be prepared and then compared to those stored in the "Something You Are" store; if a match is found, the user and jewel for login information are referenced and the user is logged in.

The second mode of operation is a verification mode, or one-to-one search (1:1). In this case, the user supplies the user id that identifies the user. The system then verifies the "something," since it already knows the id of the owner. This technique has been found to improve the speed of the database search, since it is a simple match operation.

In one embodiment, security devices can be replaced, without requiring that the entire system be overhauled. SDKs provided for each device are still used, but the described architecture preserves the security implementation at a higher level of abstraction, so that transitions from one device to another are more easily implemented.

The Something store is based upon traditional security principles, and adds a location component. "Something you know" is, for example, a PIN (Personal Identification Number), as is commonly used in automated banking machines, a password (typically a string of alpha-numeric characters that is either self-selected or computer generated), or a pass phrase (a short sentence or sentence fragment).

Moving up the scale (in terms of security) is "something you have." This is typically a token, such as a smart card, USB device, proximity radio card, or Bluetooth device. Each of these has a unique identification number that can be read from the token. The system can require possession of such a token before access is granted. Such a scheme is generally more secure, since a token exists as a single device, and cannot generally be replicated or distributed to several persons as can a password.

A higher level of security is "something you are." This is a biometric sample of the user that is unique to the user. It can be a facial scan, retinal scan, voice, fingerprint, or DNA sample. Techniques for such biometric authentication are known in the art.

The present invention also provides location as an additional entry in this store. In one embodiment, the user's IP address (or IP range for DHCP systems) is registered with the system at enrollment time. Alternatively, the MAC (Media Access Control) number (the computer's unique hardware number which is related to the IP address in most systems) may be stored. The physical location of the user, based on the IP address or MAC, allows the system to make some assumptions about the user's authenticity. For instance, if the computer in use is known to be behind a security checkpoint, then an assumption can be made that the user can be trusted to a greater degree than if he or she is accessing the system from a public workstation.

Depending on the particular application and context, different levels of security may be appropriate, and more or less stringent forms of authentication may be required. In some applications, combinations of different authentication schemes may be used.

Transaction Policy Statement

Figure 7:
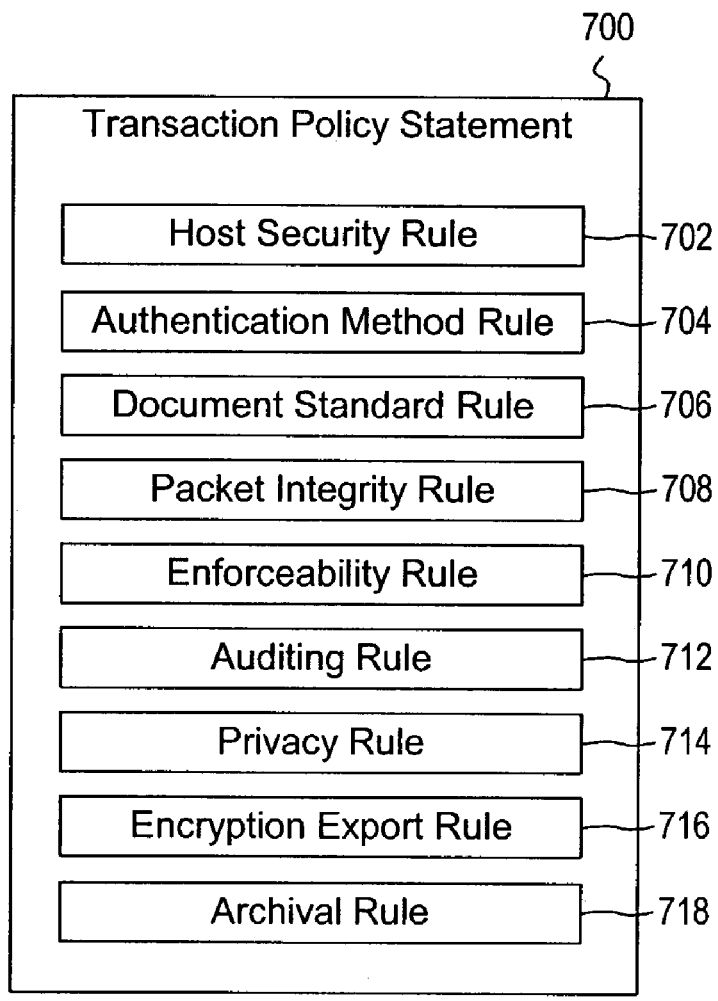
FIG. 7 is a block diagram of a transaction policy statement.

Referring to FIG. 7, a transaction policy statement 700 sets forth the rules, restrictions, agreed-upon terms, and/or compliance required for one or more e-transactions 100. It may be expressed as a set of rules, in XML form, contained within an e-transaction packet 204, but could also be represented in other ways, e.g., rules within a database. In certain implementations, the e-transaction packet 204 may include a link to a transaction policy statement 700 stored elsewhere, such as a sever within the e-transaction network 208.

The transaction policy statement 700 is used, in one embodiment, to determine whether to allow a party to sign one or more e-transaction documents 202 associated with the e-transaction packet 204 or, more generally, whether to allow the e-transaction 100 to proceed. The transaction policy statement 700 may also cause certain compliance actions to be performed in conjunction with the e-transaction 100.

As illustrated, a transaction policy statement 700 may include one or more of the following rules:

Host security rule 702. Specifies a minimum level of security for a receiving computer system to host the transaction packet 204.

Authentication method rule 704. Specifies a minimum method for authenticating a signatory.

Document standard rule 706. Specifies a particular industry format to which an associated e-transaction document 202 is to conform.

Packet integrity rule 708. Specifies that any digital signatures associated with the e-transaction packet 204 are to be validated to ensure that the e-transaction packet 204 is free from tampering.

Enforceability rule 710. Specifies that a user is to consent to carrying out a transaction in electronic form and/or that a statement of a signer's intent should be stored with a signature.

Auditing rule 712. Specifies that one or more particular actions of the system to be audited.

Privacy rule 714. Specifies viewing limitations for one or more portions of a e-transaction document 202 based on a viewer's role.

Encryption export rule 716. Specifies a maximum encryption level for an e-transaction 100 under applicable regulations.

Archival rule 718. Specifies a policy for archiving (taking off-line), media refresh schedule, and destruction date for the e-transaction packet 204.

Additional rules may be provided within the scope of the invention, some of which may be customized for particular e-transactions 100.

Figure 8:
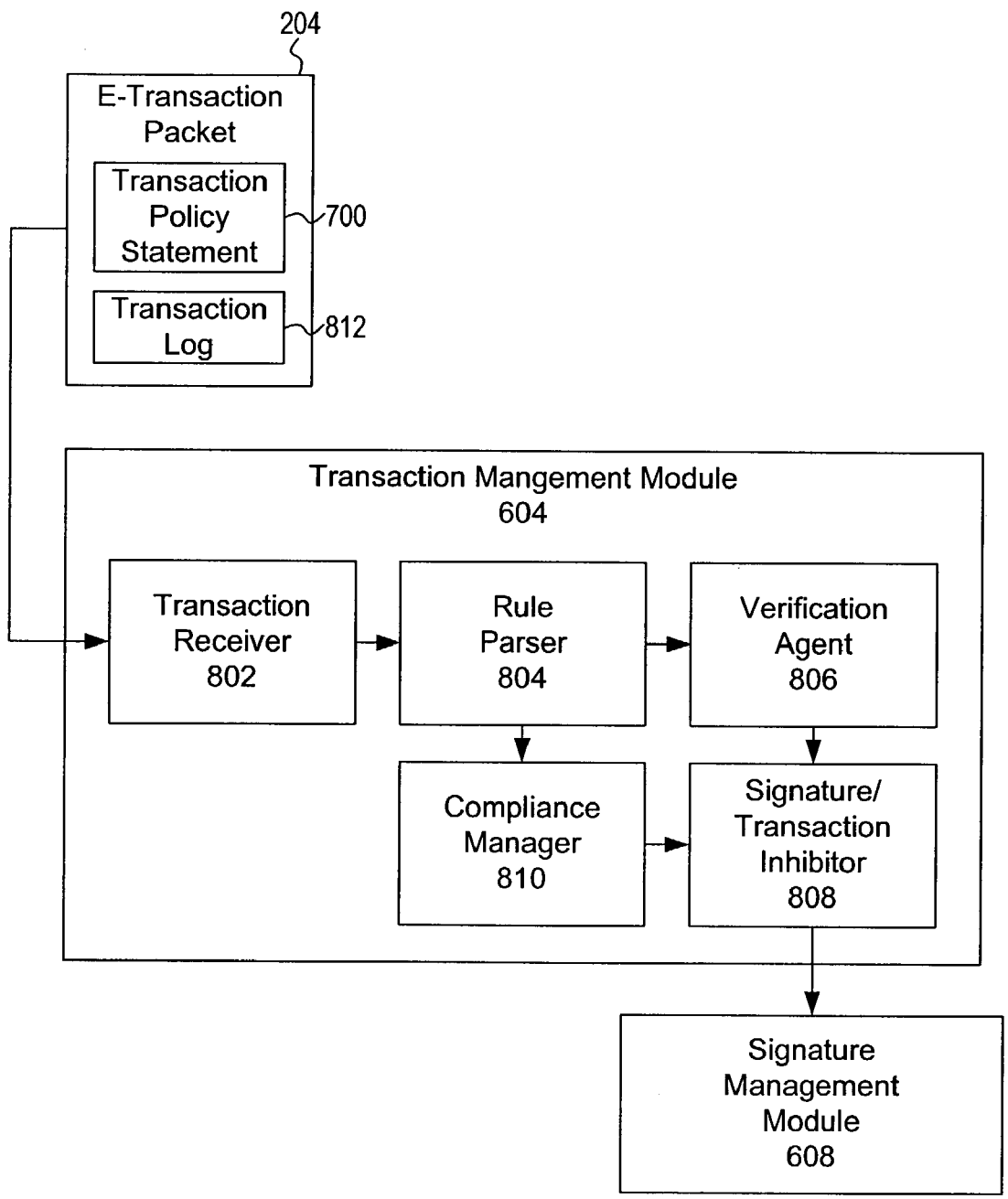
FIG. 8 is an expanded block diagram of a transaction management module.

As shown in FIG. 8, the transaction management module 604 may include or be associated with various modules for enforcing the rules of the transaction policy statement 700, such as a transaction receiver 802, a rule parser 804, a verification agent 806, a signature/transaction inhibitor 808, and a compliance manager 810. Each of the foregoing modules may be implemented using any suitable combination of hardware and/or software. Furthermore, while the foregoing modules are depicted as components of the transaction management module 604, they may be implemented as one or more separate components.

In one embodiment, the transaction receiver 802 receives an e-transaction packet 204 including a transaction policy statement 700. The e-transaction packet 204 may be received, for example, from the e-transaction network 208 (not shown) described previously.

The rule parser 804 parses the rules within the transaction policy statement 700. As mentioned above, the rules may be embodied as XML statements, although the invention is not limited in this respect. Thus, the rule parser 804 may be embodied as an XML parser.

The verification agent 806 verifies that each rule has been satisfied or met. In one embodiment, the transaction management module 604 includes multiple verification agents 806, such as one verification agent 806 for each rule.

If each rule is verified as being met, the signature management module 608 allows a participant to sign one or more documents 202 associated with the e-transaction packet 204 according to the participant's role in the e-transaction 100. However, if any of the rules are not met, the signature/transaction inhibitor 808 prevents the party from signing and/or prevents the transaction from proceeding.

For example, the signature/transaction inhibitor 808 may instruct the signature management module 608 to not allow the participant to sign. Alternatively, the signature/transaction inhibitor 808 may return the e-transaction packet 204 to the entity from which it was received (e.g., the e-transaction network 208), effectively suspending the e-transaction 100. In still other embodiments, the signature/transaction inhibitor 808 may apply a style sheet or an XML Style Language Transformation (XSLT) to prevent a participant from viewing and/or accessing the document 202.

As previously noted, certain rules of the transaction policy statement 700 may cause compliance actions to be performed in conjunction with an e-transaction 100. For example, the privacy rule 714 may specify certain compliance actions that need to be taken to preserve an individual's privacy. In one embodiment, the compliance manager 810 performs these compliance actions as directed by rules in the transaction policy statement 700.

Examples of how the transaction management module 604 may process various rules of the transaction policy statement 700 are provided below. While the following are examples of rules that may apply to many e-transactions 100, many more rules are contemplated within the scope of the invention.

Host security rule 702. Each e-transaction packet 204 may be interpreted by a transaction management module 604 running on a server or other computer system. For some e-transactions 100, the server may be required to provide minimum security measures to prevent loss, modification, or destruction of e-transactions 100. For some e-transactions 100, the cost of added physical security is not justified, while in other cases, high security may be critical. For this reason, the host security rule 702 can specify a required security level of a server for the current e-transaction 100.

In one embodiment, servers have one of three levels of security, although many more levels of security may be provided within the scope of the invention:

A—The server is in an office environment, open to all who have access to the office, with no power backup or redundant network access.

B—The server is in a data center environment with restricted physical access, a firewall, a power backup, and redundant network access with a disaster recovery plan.

C—The server is in a secure data center with monitored physical access, redundant servers with automated fail over and off-site storage, multiple firewalls, redundant power backup, and redundant network access.

Level C servers may also be required to protect against intrusion and/or denial of service (DOS) attacks. Additionally, level C facilities must also report any attempted breaches of security to be logged on by e-transaction network 208. In certain implementations, all software running on B- and C-level servers may be required to be digitally signed by the authors and run over SSL (secure sockets layer).

Level B facilities may be required to perform weekly backups and provide for optional offsite storage of the backups. Level C facilities may be required to perform daily backups and may be required to provide offsite storage.

Each server that is registered with the e-transaction network 208 may have associated with it the security level and the date of last certification. In one embodiment, each C-level server must be reviewed and certified each month, while B-level servers only need to be reviewed and certified annually. There may be no review or certification requirement for an A-level server.

In one embodiment, the host security rule 702 specifies a minimum server required to host an e-transaction 100, e.g., level B. The following is the XML rule specifying the host security rule 702 for an e-transaction 100.

```
<dta:TransactionRules>
<dta:RuleItem>
<dta:ServerLevel>B</dta:ServerLevel>
</dta:RuleItem>
</dta:TransactionRules>
```

When the transaction packet 204 is received by the transaction management module 604, the verification agent 806 checks the sever (e.g., via the e-transaction network 208 database) to be sure that the server is of level B or C. If it is found to be a level A server, the transaction packet 204 may be returned and a participant using the server cannot sign the associated document 202, and the e-transaction 100 will not be allowed to proceed.

Authentication method rule 704. The authentication method rule 704 specifies a minimum authentication method for a participant in the transaction. In one embodiment, there are three basic authentication levels—something you know, something you have, and something you are. For example, you can know a Personal Identification Number (PIN) or a password, you can have a smart card or USB token, and you are a biometric sample, such as a fingerprint, retinal scan or voice print.

The level of authentication required may be based on the role of the participant. For example, the applicant for an insurance policy may not be required to have anything, a simple click signing of the application may be sufficient, but the agent may be required to use a USB token to witness the signature by the applicant.

When the user is authenticated to the system at login time, the level can be recorded. If the authentication method rule 704 requires a higher level of authentication than the participant is validated at, the participant would not see the transaction or not be allowed to sign.

The following is an XML statement specifying an authentication method rule 704 for an e-transaction 100:

```
<dta:TransactionLog>
<dta:LogItem>
<dta:ServerId>NX-3E8</dta:ServerId>
<dta:DateTime>2002-08-11T17:01:12</dta:DateTime>
<dta:User>Bruce Brown:bruce@nxlight.com</dta:User>
<dta:Event>User log in with smart card</dta:Event>
    <dta:Description>Bruce     Brown:bruce@nxlight.com
        Initial login using a smart card.</dta:Description>
</dta:LogItem>
</dta:TransactionLog>
```

The rule for a role in a e-transaction 100 may be specified as:

```
<dta:TransactionRules>
<dta:RuleItem>
<dta:Role>Agent</dta:Role>
<dta:Rule>Authentication:smart card</dta:Rule>
</dta:RuleItem>
</dta:TransactionRules>
```

Document standard rule 706. Many industries have established standard bodies that have written XML schemas or DTDs to facilitate the interchange of information. The ACORD standard for insurance and the MISMO standard for mortgages are two such standards. The transaction policy statement 700 may specify a document standard rule 706 requiring that any e-transaction documents 202 must conform to a specified standard before the documents 202 can be signed or the e-transaction 100 can proceed.

The following is an example of a document standard rule 706 specifying the ACORD standard.

```
<dta:TransactionRules>
<dta:RuleItem>
<dta:Rule>Automation:ACORD Life Data Model</dta:
    Rule>
</dta:RuleItem>
</dta:TransactionRules>
```

The verification agent 806 may include a parser for parsing each document 202 using the DTD or schema for the specified standard to determine whether the documents 202 conform. If not, the signature/transaction inhibitor 808 prevents the participant from signing and/or the e-transaction 100 from proceeding.

In certain embodiments, the document standard rule 706 also specifies how data should be extracted from databases to pre-populate the e-transaction 100 according to the specified standard, as illustrated below.

```
<dta:TransactionLog>
<dta:LogItem>
<dta:ServerId>NX-3E8</dta:ServerId>
<dta:DateTime>2002-09-11T17:03:36</dta:DateTime>
<dta:User>Bruce Brown:bruce@nxlight.com</dta:User>
<dta:Event>Transfer Data:ACORD Life Data Model</
    dta:Event>
<dta:Description>Workflow processed:
Source:DocumentAdaptor:Docu-
    ment631664233323224979;
Target:DocumentAdaptor:Docu-
    ment6316642389050513</dta:Description>
</dta:LogItem>
</dta:TransactionLog>
```

Packet integrity rule 708. The packet integrity rule 708 specifies that any digital signatures associated with the e-transaction packet 204 must be validated before allowing a participant to sign an associated e-transaction document 202 or otherwise allow the e-transaction 100 to proceed. An example XML statement expressing the packet integrity rule 708 is provided below.

```
<dta:TransactionRules>
```

```
<dta:RuleItem>
<dta:Rule>Integrity Check:On</dta:Rule>
</dta:RuleItem>
</dta:TransactionRules>
```

In operation, the verification agent 806 validates each digital signature using standard public key infrastructure (PKI) techniques, including checking certificate revocation lists (CRLs). If any of the digital signatures are not validated, the e-transaction packet 204 may be tampered with and the signature/transaction inhibitor 808 will not allow the transaction to proceed. For example, an e-transaction packet 204 that fails the validation process may be returned to the entity from which it was received.

In one embodiment, the packet integrity rule 708 directs the compliance manager 810 to digitally sign the e-transaction packet 204 each time an action is taken. This produces an "onion" of layering of digital signatures that allows a participant to "peel" back the layers and see what took place on each step.

Enforceability rule 710. To be enforceable, each e-transaction 100 must also have assurance that it is meeting the standards set forth in the applicable laws and regulations. Some of the laws require that for consumer transactions, consent must be obtained prior to conducting business electronically. Other regulations set forth the requirement that the intent of the signer be recorded along with the signature. These limitations are understood by the transaction management module 604 and are implemented within an enforceability rule 710, one example of which is shown below.

```
<dta:TransactionRules>
<dta:RuleItem>
<dta:ServerId>NX-3E8</dta:ServerId>
<dta:DateTime>2002-09-11T17:01:11</dta:DateTime>
<dta:User>Bruce Brown:bruce@nxlight.com</dta:User>
<dta:Rule>Consent</dta:Rule>
    <dta:Description>The signer must agree to conducting
        the transaction in electronic form.</dta:Description>
<dta:Rule>Intent</dta:Rule>
    <dta:Description>The intent of the signer must be
        recorded.</dta:Description>
</dta:RuleItem>
</dta:TransactionRules>
```

Where the enforceability rule 710 specifies that the signer must agree to conduct the transaction in electronic form, the compliance manger 810 may prompt the signer for the required consent. If the signer does not agree, the compliance manager 810 may instruct the signature/transaction inhibitor 808 to prevent the e-transaction document 202 from being signed.

Similarly, where the enforceability rule 710 specifies that an indication of the intent of the signer be stored with his or her signature, the compliance manager 810 may display a statement of intent to the signer and instruct the signature management module 608 to store the statement of intent as an audit item as shown:

```
<dta:LogItem>
    <dta:ServerId>NX-3E8</dta:ServerId>
    <dta:DateTime>2002-09-11T17:01:57</dta:DateTime>
    <dta:User>Bruce    Brown:bruce@nxlight.com</dta:User>
    <dta:Event>Document    Signed:    Document631664233323224979</dta:Event>
    <dta:Description>Workflow processed: Signed Document with click</dta:Description>
    <dta:SignIntent>User is acting in the role of agent and as
        such witnesses that the information was given by the
        applicant in the insurance application.</dta:SignIntent>
</dta:LogItem>
```

Other enforceability rules 710, such as not allowing voice or sound signatures for certain e-transactions 100, could also be implemented which the transaction management module 604 would police.

Auditing rule 712. In one configuration, an e-transaction packet 204 includes a transaction log 812 that records certain actions performed in conjunction with an e-transaction 100. When an e-transaction 100 is being processed, the auditing rule 712 specifies which actions of the system are to be audited.

Any action taken in conjunction with an e-transaction 100 may be audited, examples of which are provided below.

Creating an e-transaction 100
Adding documents 202 to the e-transaction 100
Removing documents 202 from the e-transaction 100
Signing an e-transaction document 202
Editing or viewing any document 202 or metadata about the e-transaction 100
Authenticating an individual according to his or her role
Transferring an e-transaction 100 to another server for further processing
Creating sub-transactions that scatter for processing
Gathering sub-transactions after a scatter
Commenting on a document in the e-transaction 100
Adding data to a document 202
Extracting data from a document or the whole e-transaction 100.

The audit rule 712 may specify that all actions are to be audited or may list specific actions.

As an example, suppose that a life insurance company prepares the e-transaction documents 202 for their agents and builds an e-transaction packet 204. The agent downloads an e-transaction 100 to his laptop or accesses it over the web. After the documents 202 are filled out and electronic signatures attached to them, the e-transaction packet 204 is transferred to a processing server which would extract the data needed, obtain a signed "Authorization for Release of Information" that has been signed and forward it on to third parties that have information required in the processing of applications, and store the application for later use in the policy (most state law requires that the application be part of the policy when issued).

The audit information may be added to the transaction log 812 as each action is taken. The information about the creation of the packet, and by whom, may be stored first, followed by information about who added each document 202. When the agent started the session, his or her information would be added to the audit data. As the applicant signed each document, the information would be added until all the documents were finished. As the e-transaction packet 204 is moved to a processing server, the audit information about that server would be added. Since the extraction of the data is automated, the user information would be populated by the transaction management module 604 running on that processing server.

When an "Authorization for Release of Information" is extracted to be provided for third parties, it is extracted into a new e-transaction packet 204 and its creation information and by whom it was signed is transferred. The original e-transaction packet 204 would retain a copy of the document 202 with a notation in the transaction log 812 that it had been extracted. If all of these transactions are registered with the e-transaction network 208, the GUID assigned to them by the e-transaction network 208 will typically be used.

An example of audited actions within a transaction log 812 is shown below.

```
<dta:TransactionLog>
    <dta:LogItem>
        <dta:ServerId>NX-3E8</dta:ServerId>
        <dta:DateTime>2002-09-11T17:01:11</dta:DateTime>
        <dta:User>Bruce Brown:bruce@nxlight.com</dta:User>
        <dta:Event>Transaction imported:
            Transaction731664254523224487</dta:Event>
        <dta:Description>Bruce Brown:bruce@nxlight.com Initial import of Transaction.</dta:Description>
    </dta:LogItem>
    <dta:LogItem>
        <dta:ServerId>NX-3E8</dta:ServerId>
        <dta:DateTime>2002-09-11T17:01:57</dta:DateTime>
        <dta:User>Bruce Brown:bruce@nxlight.com</dta:User>
        <dta:Event>Document Signed: Document631664233323224979</dta:Event>
        <dta:Description>Workflow processed: Signed Document with click</dta:Description>
    </dta:LogItem>
    <dta:LogItem>
        <dta:ServerId>NX-3E8</dta:ServerId>
        <dta:DateTime>2002-09-11T17:03:36</dta:DateTime>
        <dta:User>Bruce Brown:bruce@nxlight.com</dta:User>
        <dta:Event>Transfer Data</dta:Event>
        <dta:Description>Workflow processed:
            Source:DocumentAdaptor:Document631664233323224979;
            Target:DocumentAdaptor:Document631664238905060853</dta:Description>
    </dta:LogItem>
</dta:TransactionLog>
```

In the above example, three audited actions are shown. The first shows the importation of the e-transaction 100 with its GUID, the user information and the date and time that the action was taken. The server is identified with an system-supplied number which is established when the transaction management module 604 is first installed and is tracked in one embodiment by the e-transaction network 208. The user is described with his name and his email address which is generally assumed to be unique. The description of the action is provided for convenience of display. The second action shows the signing of the document 202 specified by the user and the type of signature applied. The third action shows the processing of the document 202 with data flowing from one document 202 to another.

Privacy rule 714. Several laws require individuals to consent before their personally-identifiable information can be disclosed. The Gramm-Leach-Bliley Act, the Privacy of Consumer Financial Information Act of 1999, the Health Insurance Portability and Accountability Act of 1996 (HIPAA), and the Children's Online Privacy Protection Act of 1998, are just some these laws.

A privacy rule 714 within the transaction policy statement 700 may indicate one or more privacy laws, regulations, or standards that need to be complied with during the e-transaction 100. An example of a privacy rule 714 is included below.

```
<dta:TransactionRules>
    <dta:RuleItem>
        <dta:Rule>Privacy:HIPAA</dta:Rule>
    </dta:RuleItem>
</dta:TransactionRules>
```

The compliance manager 810 associates the privacy rule 714 with particular compliance actions. For example, HIPAA requires that everyone who views personally-identifiable information be logged. Hence, the compliance manager 810 will store an audit entry indicating each person who viewed a document 202 containing such information and what portions were viewed. An example of such an audit entry is provided below.

```
<dta:TransactionLog>
    <dta:LogItem>
        <dta:ServerId>NX-3E8</dta:ServerId>
        <dta:DateTime>2002-09-11T17:01:57</dta:DateTime>
        <dta:User>Bruce Brown:bruce@nxlight.com</dta:User>
        <dta:Event>Document Viewed:
            Document631664233323224979</dta:Event>
        <dta:Description>HIPAA rule: Viewed Whole Document</dta:Description>
    </dta:LogItem>
</dta:TransactionLog>
```

Further, the privacy rule 714 may direct the compliance manager to filter out personally-identifiable data restricted by HIPAA. In one embodiment, this is done with XML Style Language Transformations (XSLTs), which can be configured to filter out any portion of an e-transaction document 202. If the user views the document 202 through such a filter, an audit entry would reflect it, as illustrated below.

```
<dta:TransactionLog>
    <dta:LogItem>
        <dta:ServerId>NX-3E8</dta:ServerId>
        <dta:DateTime>2002-09-11T17:01:57</dta:DateTime>
        <dta:User>Bruce Brown:bruce@nxlight.com</dta:User>
        <dta:Event>Document Viewed Filter:
            Document631664233323224979</dta:Event>
        <dta:Description>HIPAA rule: Viewed Filter Document, Filter: XSLT2378548738292</dta:Description>
    </dta:LogItem>
</dta:TransactionLog>
```

Thus, if a question arose about what was seen, the XSLT filter with its GUID would be able to be reviewed.

Encryption export rule 716. Various national governments limit encryption levels for electronic transactions. For example, France imposes a key length restriction of 56 bits. The encryption export rule 716 may specify a maximum encryption level for a e-transaction 100. The rule 716 may be expressed as a number of bits or may indicate a nationality ("USExport"). Where an encryption export rule 716 exists and an encryption level is requested that exceeds prescribed limits, the compliance manager 810 may deny the request or take other suitable action (e.g., prevent entry of the e-transaction packet 204 into a country having such restrictions). An example of an encryption export rule 716 is provided below.

```
<dta:TransactionRules>
    <dta:RuleItem>
        <dta:Rule>USExport</dta:Rule>
    </dta:RuleItem>
</dta:TransactionRules>
```

Archival Rule 718.

The archival rule 718 may specify the policy for archiving (taking off line), media refresh schedule, and destruction date for the e-transaction packet 204. An example of an XML archival rule 718 is provided below.

```
<dta:TransactionRules>
    <dta:RuleItem>
        <dta:Rule>Archive:No</dta:Rule>
        <dta:Rule>MediaRefresh:Three</dta:Rule>
        <dta:Rule>DestructionDate:Completion+Two Years
        </dta:Rule>
    </dta:RuleItem>
```

</dta:TransactionRules>

In this example, the archival rule 718 specifies that the e-transaction packet 204 is to stay online in the system and not be archived out. The media upon which it is written is to be refreshed every three years, and the destruction date is two years after the completion of all workflow in the e-transaction packet 204. The compliance manger 810 would interpret these rules and implement them. When the destruction date is reached, the administrator of the system, along with the creator of the e-transaction 100, may have to concur to delete the e-transaction 100.

Figure 9:
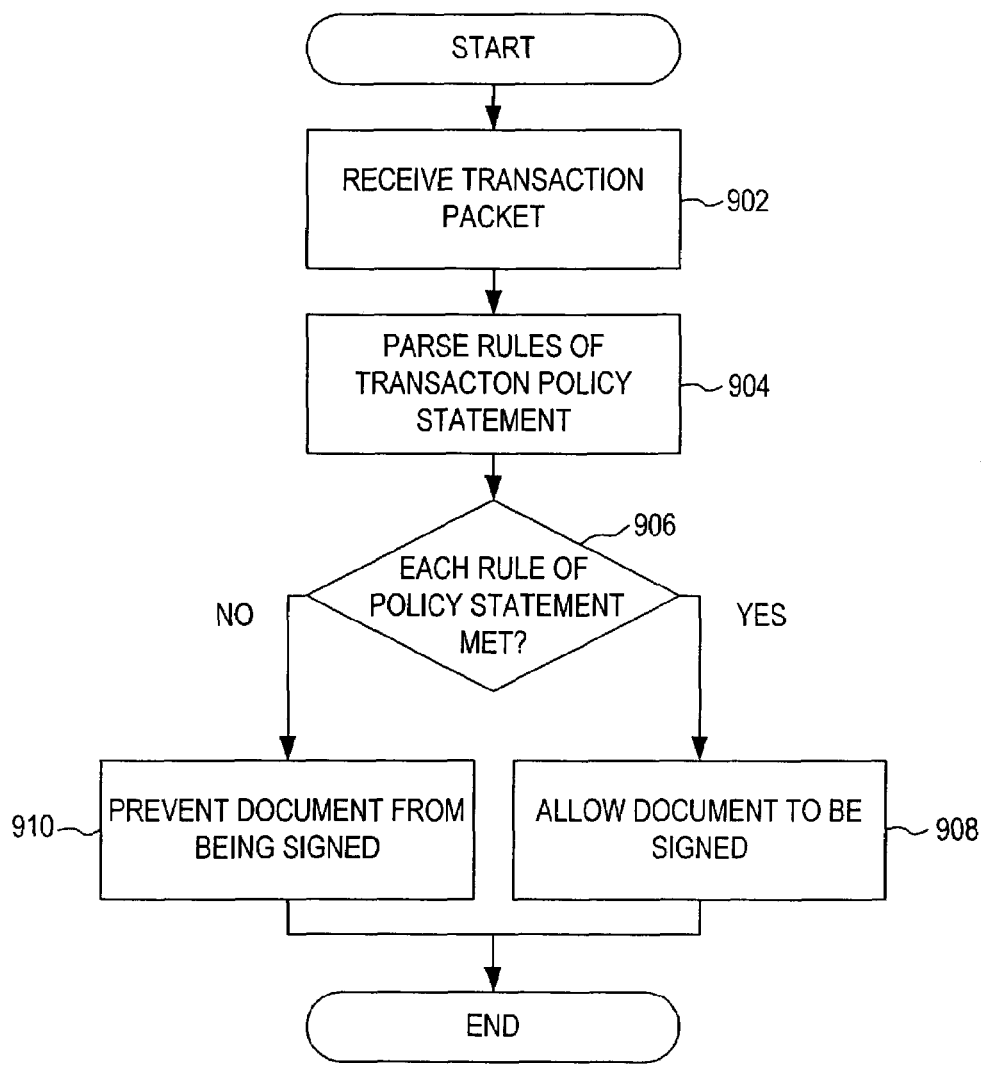
FIG. 9 is a flowchart of a method for processing an e-transaction.

Referring to FIG. 9, a method 900 within a transaction processing system for processing an e-transaction 100 begins by receiving 902 an e-transaction packet 204. As noted, the e-transaction packet 204 may include one or more e-transaction documents 202, as well as processing instructions for using the documents 202 to complete the e-transaction 100.

The method 900 continues by parsing 904 one or more rules of a transaction policy statement 700 associated with the e-transaction packet 204. The rules may be embodied as XML statements defining the regulations, standards, compliance requirements, and/or agreed-upon terms of the e-transaction 100. The rules may include, for example, host security rule 702, an authentication method rule 704, a document standard rule 706, a packet integrity rule 708, an enforceability rule 710, an auditing rule 712, a privacy rule 714, an encryption export rule 716, and/or an archival rule 718.

After the rules have been parsed 904, a determination 906 is made whether each rule of the transaction policy statement 700 has been met. If so, a participant is allowed 908 to sign one or more of the e-transaction documents 202 associated with the e-transaction packet 204 in accordance with the processing instructions.

If, however, one or more of the rules have not been met, the participant is prevented 910 from signing. As explained above, this may be accomplished in a number of ways, e.g., the e-transaction packet 204 could be returned, an XSLT could be applied to prevent the participant from viewing the document 202, etc.

In view of the foregoing, the disclosed e-transaction architecture 200 transforms signed paper documents and related manual processes into real-time, enforceable e-transactions 100 that reduce the cost, risk and time imposed by paper transactions. The e-transaction architecture 200 uses open standards and enables documents 202 to be delivered real-time in a completely enforceable, electronic format utilizing the Internet. The e-transaction architecture 200 eliminates the need to gather signatures on paper and use costly paper-based processes to close transactions. By connecting entire industries and/or disparate industries into a seamless web of electronic activity, all parties are able to forge new relationships and develop new ways to manufacture, and distribute products to customers.

In the case of the insurance industry, the e-transaction architecture 200 enables instant-issue, rapid-issue and direct-issue insurance products to be delivered real-time in a completely enforceable, electronic format. The e-transaction architecture 200 eliminates the need to gather signatures on paper and use costly paper-based processes to close insurance transactions. The e-transaction architecture 200 delivers real-time insurance e-transactions 100 while maintaining complete automation and enforceability and complying fully with electronic signature and privacy legislation.

The e-transaction network 208 connects all participants in the insurance industry into a fluid electronic network for insurance e-transactions 100. By connecting the entire insurance industry into a seamless web of electronic activity, agents, distributors and underwriters are able to forge new relationships and develop new ways to create, underwrite and distribute custom insurance products to customers.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A transaction processing system comprising:
   a processor, a memory, computer readable instructions stored in the memory that when executed by the processor perform the process of:
   receiving a plurality of transaction packets, each transaction packet comprising a document and a transaction policy statement, and wherein each transaction policy statement includes a set of rules specific to its respective transaction packet and not the other transaction packets in the plurality of transaction packets;
   accessing by a rule parser each of the plurality of transaction packets the transaction policy statements and the set of rules specific to each of said packets, wherein the set of rules in at least one of the transaction policy statements includes one or more signature rules that define requirements for electronically signing its respective document;
   retrieving role verification rules from a server;
   determining by a verification agent whether the signature rules are met,
   verifying a role of a signatory based on role verification rules retrieved from said server; and
   preventing by a signature inhibitor the respective document from being electronically signed based on the verifying of a role of a signatory.

2. The system of claim 1, wherein the at least one transaction policy statement includes a host security rule specifying a minimum level of security for a receiving computer system to host the respective transaction packet.

3. The system of claim 2, wherein the host security rule specifies that the receiving computer system is to provide restricted physical access, a firewall, a power backup, and redundant network access.

4. The system of claim 2, wherein the host security rule specifies that the receiving computer system is to provide monitored physical access, multiple firewalls, a redundant power backup, offsite storage, and redundant network access.

5. The system of claim 2, wherein the signature inhibitor is to return the respective transaction packet in response to the receiving computer system not having the requisite minimum level of security.

6. The system of claim 1, wherein the one or more signature rules include an authentication method rule specifying a minimum method for authenticating a signatory.

7. The system of claim 6, wherein the authentication method rule specifies a minimum authentication method based on a signatory's role in the respective transaction.

8. The system of claim 6, wherein the authentication method is selected from the group consisting of a pass code, a digital certificate, a token, and a biometric scan.

9. The system of claim 6, wherein the signature inhibitor is to block a signatory's access to the respective document in response to the authentication method rule not being met for the signatory.

10. The system of claim 9, wherein the signature inhibitor is to apply a style sheet that prevents the signatory from viewing or modifying the respective document.

11. The system of claim 1, wherein the at least one transaction policy statement comprises a document standard rule specifying a particular industry format to which the respective document is to conform.

12. The system of claim 11, wherein the industry format is specified in a schema, and wherein the verification agent is to parse the respective document using the schema.

13. The system of claim 1, wherein the at least one transaction policy statement comprises a packet integrity rule specifying that any digital signatures associated with the respective transaction packet are to be validated to ensure that the respective transaction packet is free from tampering before allowing the respective document to be signed.

14. The system of claim 13, wherein the at least one transaction policy statement includes an enforceability rule specifying that a participant is to consent to the respective transaction being carried out in electronic form.

15. The system of claim 14, wherein the signature inhibitor is to prevent the user from signing the respective document unless the user consents.

16. The system of claim 1, wherein the at least one transaction policy statement comprises a host security rule and an authentication method rule.

17. The system of claim 1, wherein the at least one transaction policy statement comprises a host security rule, an authentication method rule, a document standard rule, and an enforceability rule.

18. A transaction processing system in a computer network, comprising:
a processor, a memory, computer readable instructions stored in the memory that when executed by the processor perform the process of:
obtaining by a transaction receiver a plurality of transaction packets through the computer network, each transaction packet including a document and a transaction policy statement, and wherein each transaction policy statement includes a set of rules specific to its respective transaction packet and not the other transaction packets in the plurality of transaction packets;
accessing by a rule parser each of the plurality of transaction packets the transaction policy statements, and the set of rules specific to each of said packets, wherein the set of rules in at least one of the transaction policy statements includes one or more rules for allowing the respective transaction to proceed;
retrieving role verification rules from a server; determining by a verification agent whether the set of rules of the at least one transaction policy statement are met, verifying a role of a user based on role verification rules retrieved from said server; and
preventing by a signature inhibitor the respective document from being electronically signed based on the verifying of a role of a user.

19. A transaction processing system in a computer network, comprising:
a processor, a memory, computer readable instructions stored in the memory that when executed by the processor perform the process of:
obtaining by a transaction receiver a plurality of transaction packets through the computer network, each transaction packet including a document and a transaction policy statement, and wherein each transaction policy statement includes a set of rules specific to its respective transaction packet and not the other transaction packets in the plurality of transaction packets;
accessing by a rule parser each of the plurality of transaction packets the transaction policy statements, and the set of rules specific to each of said packets, wherein the set of rules in at least one of the transaction policy statements includes one or more rules to be complied with during the respective transaction;
retrieving role verification rules from a server; and
executing by a compliance agent a compliance action for each rule in the set of rules of the at least one transaction policy statement
verifying a role of a viewer based on the role verification rules stored on the server and preventing by a signature inhibitor the respective document from being electronically signed based on the verifying of a role of a viewer.

20. The system of claim 19, wherein the at least one transaction policy statement includes an auditing rule specifying one or more particular actions of the transaction processing system to be audited.

21. The system of claim 19, wherein the compliance agent is to create an audit record in the respective transaction packet for each specified action that occurs within the transaction processing system.

22. The system of claim 20, wherein the actions to be audited are selected from the group consisting of adding documents to a transaction, authenticating an individual, transferring a transaction between systems, viewing a document, editing a document, signing a document, and extracting data from a document.

23. The system of claim 19, wherein the at least one transaction policy statement includes a privacy rule specifying viewing limitations for one or more portions of respective document.

24. The system of claim 23, wherein the compliance agent is to determine a role of a viewer and conceal the one or more portions of the respective document based on the viewer's role and the privacy rule.

25. The system of claim 24, wherein the compliance agent is to apply a style sheet to the respective document to conceal the one or more portions.

26. The system of claim 25, wherein the compliance agent is to store in the respective transaction packet an indication of the style sheet applied to the respective document.

27. The system of claim 24, wherein the compliance agent is to store in the respective transaction packet an indication of the viewer and what was viewed.

28. The system of claim 19, wherein the at least one transaction policy statement includes an enforceability rule specifying that an indication of a signer's intent be stored with a corresponding signature.

29. The system of claim 19, wherein the at least one transaction policy statement includes an encryption export rule specifying a maximum encryption level for the respective transaction under applicable regulations.

30. The system of claim 29, wherein the compliance agent is to deny a request to use an encryption level for the respective transaction that exceeds the maximum specified in the encryption export rule.

31. The system of claim, wherein the at least one transaction policy statement includes a packet integrity rule specifying that the respective transaction packet is to be verified to be free from tampering.

32. The system of claim 31, wherein the compliance agent is to validate each digital signature associated with the respective transaction packet to ensure that the respective transaction packet is free from tampering.

33. A method in a transaction processing system comprising:
- receiving, by a receiving computer system, a plurality of transaction packets, each transaction packet comprising a document and a transaction policy statement, and wherein each transaction policy statement includes a set of rules specific to its respective transaction packet and not the other transaction packets in the plurality of transaction packets;
- accessing from each of the transaction packets the transaction policy statements, and the set of rules specific to each of said packets, wherein the set of rules in at least one of the transaction policy statements includes one or more signature rules that define requirements for electronically signing its respective document;
- retrieving role rules from a server;
- verifying a role associated with a signatory based on the role rules retrieved from said server;
- verifying, using the receiving computer system, whether the signature rules are met; and preventing by a signature inhibitor the respective document from being electronically signed based on the verifying of a role of a signatory and the verifying whether the signature rules are met.

34. The method of claim 33, wherein the at least one transaction policy statement includes a host security rule specifying a minimum level of security for a receiving computer system to host the respective transaction packet.

35. The method of claim 34, wherein the host security rule specifies that the receiving computer system is to provide restricted physical access, a firewall, a power backup, and redundant network access.

36. The method of claim 34, wherein the host security rule specifies that the receiving computer system is to provide monitored physical access, multiple firewalls, a redundant power backup, offsite storage, and redundant network access.

37. The method of claim 34, wherein preventing comprises:
- returning the respective transaction packet in response to the receiving computer system not having the requisite minimum level of security.

38. The method of claim 33, wherein the at least one transaction policy statement includes an authentication method rule specifying a minimum method for authenticating a signatory of the respective document.

39. The method of claim 38, wherein the authentication method rule specifies a minimum authentication method based on a signatory's role in the respective transaction.

40. The method of claim 38, wherein the authentication method is selected from the group consisting of a pass code, a digital certificate, a token, and a biometric scan.

41. The method of claim 38, wherein preventing comprises:
- blocking a signatory's access to the respective document in response to the authentication method rule not being met for the signatory.

42. The method of claim 41, wherein blocking comprises:
- applying a style sheet that prevents the signatory from viewing or modifying the respective document.

43. The method of claim 33, wherein the at least one transaction policy statement comprises a document standard rule specifying a particular industry format to which the respective document is to conform.

44. The method of claim 43, wherein the industry format is specified in a schema, and wherein verifying comprises:
- parsing the respective document using the schema.

45. The method of claim 33, wherein the at least one transaction policy statement comprises a packet integrity rule specifying that any digital signatures associated with the respective transaction packet are to be validated to ensure that the respective transaction packet is free from tampering.

46. The method of claim 33, wherein the at least one transaction policy statement includes an enforceability rule specifying that a user is to consent to the respective transaction being carried out in electronic form.

47. The method of claim 46, wherein preventing comprises:
- preventing the user from signing the respective document unless the user consents to the respective transaction being carried out in electronic form.

48. The method of claim 33, wherein the at least one transaction policy statement comprises a host security rule and an authentication method rule.

49. The method of claim 33, wherein the at least one transaction policy statement comprises a host security rule, an authentication method rule, a document standard rule, a packet integrity rule, and an enforceability rule.

50. A method in a transaction processing system in a computer network comprising:
- receiving, by a processor, a plurality of transaction packets, each transaction packet including a document and a transaction policy statement, and wherein each transaction policy statement includes a set of rules specific to its respective transaction packet and not the other transaction packets in the plurality of transaction packets;
- accessing from each of the transaction packets the transaction packet and not the other transaction packets in the plurality of transaction packets;
- accessing from each of the transaction packets the transaction policy statements, and the set of rules specific to each of said packets, wherein the set of rules in at least one of the transaction policy statements includes one or more rules for allowing the respective transaction to proceed;
- retrieving role rules from a server,
- verifying a role associated with a user based on the role verification rules retrieved from said server,
- verifying, using the processor, whether the set of rules of the at least one transaction policy statement are met; and
- preventing by a signature inhibitor the respective document from being electronically signed based on the verifying of a role of a signatory and the verifying whether the set of rules of the at least one transaction policy statement are met.

51. A method in a transaction processing system in a computer network comprising:
- receiving, by a processor, a plurality of transaction packets, each transaction packet including a document and a transaction policy statement that processes the document to complete a transaction, wherein each transaction policy statement, and wherein each transaction policy statement includes a set of rules specific to its respective transaction packet and not the other transaction packets in the plurality of transaction packets;
- accessing from each of the transaction packets the transaction policy statements, and the set of rules specific to each of said packets, wherein the set of rules in at least one of the transaction policy statements includes one or more rules to be complied with during the respective transaction; retrieving role rules from a server;
- verifying a role associated with a viewer based on the role verification rules retrieved from said server; and executing a compliance action for each rule in the set of rules of the at least one transaction policy statement and preventing by a signature inhibitor the respective document from being electronically signed based on the verifying of a role of a viewer.

52. The method of claim 51, wherein the at least one transaction policy statement includes an auditing rule specifying one or more particular actions of the transaction processing system to be audited.

53. The method of claim 51, wherein executing comprises:
creating an audit record in the at least one transaction packet for each specified action that occurs within the transaction processing system.

54. The method of claim 52, wherein the actions to be audited are selected from the group consisting of adding documents to a transaction, authenticating an individual, transferring a transaction between systems, viewing a document, editing a document, signing a document, and extracting data from a document.

55. The method of claim 51, wherein the at least one transaction policy statement includes a privacy rule specifying viewing limitations for one or more portions of the respective document.

56. The method of claim 55, wherein executing comprises:
determining a role of a viewer; and
concealing the one or more portions of the respective document based on the viewer's role and the privacy rule.

57. The method of claim 56, wherein concealing comprises:
applying a style sheet to the respective document to conceal the one or more portions.

58. The method of claim 57, further comprising:
storing in the respective transaction packet an indication of the style sheet applied to the respective document.

59. The method of claim 56, further comprising:
storing in the respective transaction packet an indication of the viewer and what was viewed.

60. The method of claim 51, wherein the at least one transaction policy statement includes an enforceability rule specifying that an indication of a signer's intent be stored with a corresponding signature.

61. The method of claim 51, wherein the at least one transaction policy statement includes an encryption export rule specifying a maximum encryption level for the respective transaction under applicable regulations.

62. The method of claim 61, wherein executing comprises:
denying a request to use an encryption level for the respective transaction that exceeds the maximum specified in the encryption export rule.

63. The method of claim 51, wherein the at least one transaction policy statement includes a packet integrity rule specifying that the respective transaction packet is to be verified to be free from tampering.

64. The method of claim 63, wherein executing comprises:
validating each digital signature associated with the respective transaction packet to ensure that the respective transaction packet is free from tampering.

65. A transaction processing apparatus comprising:
a processor, a memory, computer readable instructions stored in the memory that when executed by the processor perform the process of:
receiving a plurality of transaction packets, each transaction packet comprising a document and a transaction policy statement, and wherein each transaction policy statement includes a set of rules specific to its respective transaction packet and not the other transaction packets in the plurality of transaction packets;
accessing from each of the plurality of transaction packets the transaction policy statements and the set of rules specific to each of said packets, wherein the set of rules in at least one of the transaction policy statements includes one or more signature rules that define requirements for electronically signing its respective document;
retrieving role verification rules from a server; verifying a role associated with a user based on the role verification rules retrieved from said server;
verifying whether the signature rules are met;
preventing by a signature inhibitor the respective document from being electronically signed based on the verifying step.

66. A computer program product comprising program code for performing a method in a transaction processing system, the method comprising:
receiving, by a processor, a plurality of transaction packets, each transaction packet comprising a document and a transaction policy statement, and wherein each transaction policy statement includes a set of rules specific to its respective transaction packet and not the other transaction packets in the plurality of transaction packets;
accessing from each of the transaction packets the transaction policy statements, and the set of rules specific to each of said packets, wherein the set of rules in at least one of the transaction policy statements includes one or more signature rules that define requirements for electronically signing the respective document;
retrieving role rules from a server;
verifying a role associated with a user based on the role verification rules retrieved from said server;
verifying, using the processor, whether the signature rules are met; and
preventing by a signature inhibitor the respective document from being electronically signed based on the verifying of the role and the verifying whether the signature rules are met.

* * * * *